US012527009B2

(12) United States Patent
Lai et al.

(10) Patent No.: US 12,527,009 B2
(45) Date of Patent: Jan. 13, 2026

(54) MEMORY DEVICE AND METHOD FOR OPERATING THE SAME

(71) Applicant: MACRONIX INTERNATIONAL CO., LTD., Hsinchu (TW)

(72) Inventors: Erh-Kun Lai, Taichung County (TW); Hsiang-Lan Lung, Kaohsiung (TW)

(73) Assignee: MACRONIX INTERNATIONAL CO., LTD., Hsinchu (TW)

( * ) Notice: Subject to any disclaimer, the term of this patent is extended or adjusted under 35 U.S.C. 154(b) by 150 days.

(21) Appl. No.: 18/414,502

(22) Filed: Jan. 17, 2024

(65) Prior Publication Data
US 2025/0234566 A1 Jul. 17, 2025

(51) Int. Cl.
*H10B 99/00* (2023.01)
*G11C 13/00* (2006.01)

(52) U.S. Cl.
CPC ............. *H10B 99/10* (2023.02); *G11C 13/00* (2013.01)

(58) Field of Classification Search
CPC ................................ H10B 99/10; G11C 13/00
USPC ......................................................... 365/129
See application file for complete search history.

(56) References Cited

U.S. PATENT DOCUMENTS

| 11,538,829 | B2 | 12/2022 | Lai | |
|---|---|---|---|---|
| 2016/0163389 | A1 | 6/2016 | Zhang | |
| 2021/0159248 | A1 | 5/2021 | Zhang | |
| 2021/0249435 | A1* | 8/2021 | Lai | H10B 43/50 |
| 2024/0224541 | A1* | 7/2024 | Wang | H10B 63/24 |
| 2024/0395351 | A1* | 11/2024 | Kim | G11C 7/12 |
| 2025/0078929 | A1* | 3/2025 | Moon | H10B 80/00 |

FOREIGN PATENT DOCUMENTS

TW 202131423 A 8/2021

* cited by examiner

*Primary Examiner* — Fernando Hidalgo
(74) *Attorney, Agent, or Firm* — McClure, Qualey & Rodack, LLP

(57) ABSTRACT

A memory device and a method for operating a memory device are provided. The memory device includes a stack structure including a memory array stack and a staircase stack, an insulating film on the memory array stack, a conductive film on the staircase stack and on a sidewall of the insulating film, a pillar element on the staircase stack and passing through the conductive film, and memory cells in the memory array stack and electrically connected to the pillar element.

20 Claims, 35 Drawing Sheets

MEMORY DEVICE AND METHOD FOR OPERATING THE SAME

BACKGROUND

Technical Field

The disclosure relates to a memory device and a method for operating the same, and more particularly to a three-dimensional memory device and a method for operating the same.

Description of the Related Art

The three-dimensional memory devices are currently the mainstream technology due to their high bit density. However, most of the three-dimensional memory devices still have some electrical problems. There is still a need to provide an improved three-dimensional memory device and a method for manufacturing the same.

SUMMARY

According to an embodiment of the present disclosure, a memory device is provided. The memory device includes a stack structure including a memory array stack and a staircase stack, an insulating film on the memory array stack, a conductive film on the staircase stack and on a sidewall of the insulating film, a pillar element on the staircase stack and passing through the conductive film, and memory cells in the memory array stack and electrically connected to the pillar element.

According to an embodiment of the present disclosure, a method for operating a memory device is provided. The memory device includes memory cells, a plurality of bit lines electrically connected to the memory cells, a plurality of word lines electrically connected to the memory cells, and a plurality of word line switches electrically connected to the memory cells and the plurality of word lines. The method for operating the memory device includes: applying a word line voltage to a word line of the plurality of word lines electrically connected to a selected memory cell of the memory cells, applying a control voltage to a word line switch of the plurality of word line switches electrically connected to the selected memory cell, and applying a bit line voltage to a bit line of the plurality of bit lines electrically connected to the selected memory cell to turn on the selected memory cell, wherein applying the control voltage to the word line switch electrically connected to the selected memory cell causes the word line electrically connected to the selected memory cell to be turned on, applying the control voltage to the word line switch electrically connected to the selected memory cell will not cause the plurality of bit lines to be turned on or turned off.

The above and other embodiments of the disclosure will become better understood with regard to the following detailed description of the non-limiting embodiment(s). The following description is made with reference to the accompanying drawings.

DETAILED DESCRIPTION

Figure 1A:
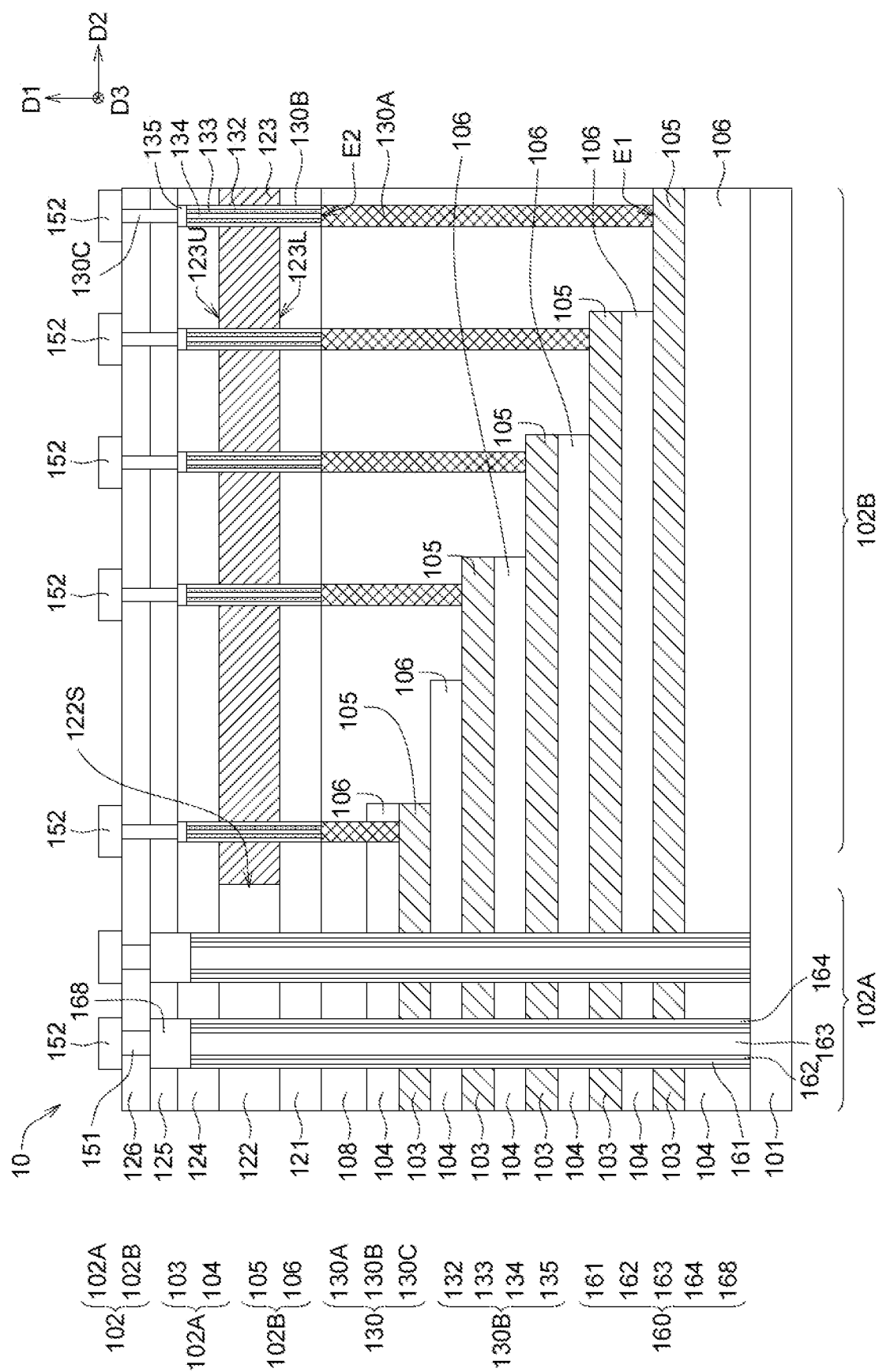
FIG. 1A illustrates a schematic cross-sectional view of a memory device according to an embodiment of the present disclosure.

Various embodiments will be described more fully hereinafter with reference to accompanying drawings, which are provided for illustrative and explaining purposes rather than a limiting purpose. For clarity, the components may not be drawn to scale. In addition, some components and/or reference numerals may be omitted from some drawings. It is contemplated that the elements and features of one embodiment can be beneficially incorporated in another embodiment without further recitation.

The following definitions and abbreviations are to be used for the interpretation of the claims and the specification. As used herein, the terms "comprises" "comprising" "includes" "including" "has" "having" "contains" or "containing" or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" can be understood to include any integer number greater than or equal to one, i.e. one, two, three, four, etc. The terms "a plurality" can be understood to include any integer number greater than or equal to two, i.e. two, three, four, five, etc. The term "connection" can include both an indirect "connection" and a direct "connection."

Figure 1B:
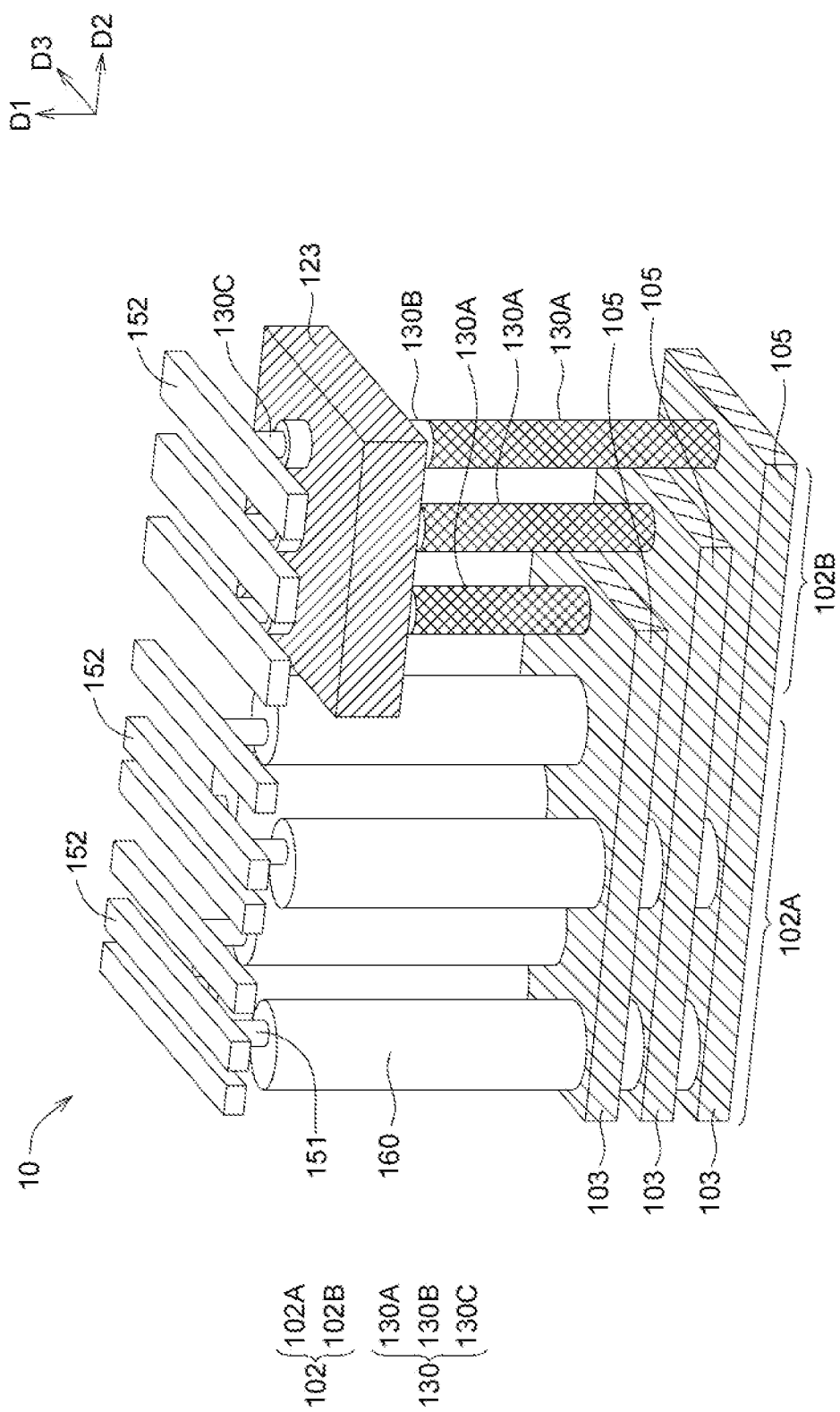
FIG. 1B illustrates a schematic stereoscopic view of a memory device according to an embodiment of the present disclosure.

Referring to FIGS. 1A and 1B, FIG. 1A illustrates a schematic cross-sectional view of a memory device 10 according to an embodiment of the present disclosure, and FIG. 1B illustrates a schematic stereoscopic view of the memory device 10 according to an embodiment of the present disclosure. To keep the illustration simple and clear, some elements shown in FIG. 1A are omitted in FIG. 1B, and the numbers of the same components in FIGS. 1A and 1B may be different. The memory device 10 may be a three-dimensional ovonic threshold switch (OTS) memory.

The memory device 10 includes a substrate 101, a stack structure 102, an insulating material film 108, an insulating film 121, an insulating film 122, a conductive film 123, an insulating film 124, an insulating film 125, an insulating film 126, a pillar element 130, a contact pillar 151, a wire 152 and a pillar structure 160. The stack structure 102 is on the substrate 101 along a first direction D1. For example, the first direction D1 is a vertical direction or a longitudinal direction. The stack structure 102 includes a memory array stack 102A and a staircase stack 102B. The memory array stack 102A and the staircase stack 102B may be adjacent to each other. The memory array stack 102A and the staircase stack 102B may be disposed in a non-overlap manner in the first direction D1. In this embodiment, the memory array stack 102A and the staircase stack 102B are disposed along a second direction D2. In this embodiment, the memory array stack 102A and the staircase stack 102B are disposed in a non-overlap manner in the third direction D3. For example, the second direction D2 and the third direction D3 are horizontal directions or transverse directions. The first direction D1, the second direction D2 and the third direction D3 are perpendicular to each other. The memory array stack 102A includes conductive layers 103 and insulating layers 104 stacked alternately along the first direction D1. The conductive layers 103 are separated from each other by the insulating layers 104. The staircase stack 102B includes conductive stair layers 105 and insulating stair layers 106 stacked alternately along the first direction D1. The conductive stair layers 105 are separated from each other by the insulating stair layers 106. In the staircase stack 102B, the conductive stair layers 105 have different sizes; the sizes of the conductive stair layers 105 are, for example, the areas on a plane formed by the second direction D2 and the third direction D3, or widths in the second direction D2, or widths in the third direction D3. For example, the area of the conductive stair layer 105 on a plane formed by the second direction D2 and the third direction D3 becomes smaller from bottom to top along the first direction D1. For example, a conductive stair layer 105 at a lower level has an area on a plane formed by the second direction D2 and the third direction D3 larger than an area on a plane formed by the second direction D2 and the third direction D3 that a conductive stair layer 105 at an upper level has. The conductive layers 103 of the memory array stack 102A are electrically connected to the conductive stair layers 105 of the staircase stack 102B. The insulating layers 104 of the memory array stack 102A and the insulating stair layers 106 of the staircase stack 102B may be electrically insulated. The conductive layers 103 of the memory array stack 102A and the conductive stair layers 105 of the staircase stack 102B can be functioned as gate structures of the memory device 10.

In an embodiment, the conductive layers 103 of the memory array stack 102A and the conductive stair layers 105 of the staircase stack 102B may have a one-to-one correspondence. In other words, a conductive layer 103 and a corresponding conductive stair layer 105 may have the same height (or level) in the first direction D1. In an embodiment, an upper surface of a conductive layer 103 and an upper surface of a corresponding conductive stair layer 105 may be coplanar. In an embodiment, a height of a conductive layer 103 in the first direction D1 may be smaller than a height of a corresponding conductive stair layer 105 in the first direction D1. In an embodiment, the insulating layers 104 of the memory array stack 102A and the insulating stair layers 106 of the staircase stack 102B may have a one-to-one correspondence. In other words, an insulating layer 104 and a corresponding insulating stair layer 106 may have the same height (or level) in the first direction D1. FIG. 1 illustrates five levels of conductive layers 103 and five levels of conductive stair layers 105. However, the present disclosure is not limited thereto. The memory device may include more levels of conductive layers 103 and conductive stair layers 105.

The insulating material film 108 is on the memory array stack 102A and the staircase stack 102B. The insulating material film 108 may cover an upper surface of the memory array stack 102A, an upper surface of the staircase stack 102B and sidewalls of the staircase stack 102B. The insulating film 121, the insulating film 122, the insulating film 124, the insulating film 125 and the insulating film 126 are sequentially disposed on the stack structure 102 and the insulating material film 108 along the first direction D1. In the first direction D1, the insulating film 121 may overlap the memory array stack 102A and the staircase stack 102B. The insulating film 122 and the conductive film 123 are on the insulating film 121. The insulating film 122 is on the memory array stack 102A. In the first direction D1, the insulating film 122 may overlap the memory array stack 102A. The insulating film 121 is between the insulating film 122 and the memory array stack 102A. The conductive film 123 is on the staircase stack 102B. In the first direction D1, the conductive film 123 may overlap the staircase stack 102B. The insulating film 121 is between the conductive film 123 and the staircase stack 102B. The conductive film 123 is on a sidewall 122S of the insulating film 122. The conductive film 123 may adjoin the insulating film 122. The conductive film 123 and the insulating film 122 may be disposed along the second direction D2. In an embodiment, the conductive film 123 and the insulating film 122 may have the same height (or level) in the first direction D1. The insulating film 124 is on the insulating film 122. The insulating film 122 is between the insulating film 124 and the insulating film 121. The insulating film 125 is on the insulating film 124. The insulating film 124 is between the insulating film 125 and the insulating film 122. The insulating film 126 is on the insulating film 125. The insulating film 125 is between the insulating film 126 and the insulating film 124. In the first direction D1, the insulating film 124, the insulating film 125 and the insulating film 126 may overlap the memory array stack 102A and the staircase stack 102B.

The memory device 10 includes one or more pillar elements 130. The pillar elements 130 are arranged separately from each other. The pillar element 130 is on the staircase stack 102B of the stack structure 102. The pillar element 130 is on the conductive stair layer 105 of the staircase stack 102B. The pillar element 130 is electrically connected to the conductive stair layers 105 and the conductive layer 103. The pillar element 130 extends along the first direction D1 and passes through the insulating material film 108, the insulating film 121, the conductive film 123, the insulating film 124, the insulating film 125 and the insulating film 126. The pillar element 130 includes a first pillar portion 130A, a second pillar portion 130B and a third pillar portion 130C arranged in sequence from bottom to top along the first direction D1. The second pillar portion 130B is between the first pillar portion 130A and the third pillar portion 130C. The first pillar portion 130A, the second pillar portion 130B and the third pillar portion 130C are electrically connected to each other. The first pillar portion 130A extends along the first direction D1, passes through the insulating material film 108 and land on the conductive stair layer 105. The first pillar portion 130A has a first end E1 and a second end E2 opposite to the first end E1. The first end E1 of the first pillar portion 130A is on an upper surface of the conductive stair layer 105 of the staircase stack 102B. The second end E2 of the first pillar portion 130A connects to the second pillar portion 130B. The second pillar portion 130B is in the insulating film 121, the conductive film 123 and the insulating film 124. The second pillar portion 130B includes a dielectric element 132, a channel element 133, a dielectric pillar 134 and a pad 135. The dielectric element 132 is between the channel element 133 and the conductive film 123. The dielectric element 132 is on the outer sidewall of the channel element 133. The dielectric element 132 may surround the channel element 133. The channel element 133 is between the dielectric element 132 and dielectric pillar 134. The channel element 133 may be on a sidewall of the dielectric pillar 134. The channel element 133 may surround the dielectric pillar 134. The dielectric element 132 and the channel element 133 may have tubular shapes. The pillar element 130 is electrically insulated from the conductive film 123 by the dielectric element 132. The dielectric element 132, the channel element 133 and the dielectric pillar 134 may extend beyond an upper surface 123U and an lower surface 123L of the conductive film 123 along the first direction D1. The pad 135 is on the channel element 133 and the dielectric pillar 134. The pad 135 is between the channel element 133 and the third pillar portion 130C. The third pillar portion 130C extends along the first direction D1 and passes through the insulating film 125 and the insulating film 126. The third pillar portion 130C may electrically connected to the channel element 133 of the second pillar portion 130B through the pad 135 of the second pillar portion 130B. In an embodiment, the conductive film 123, the dielectric element 132 and the channel element 133 form a transistor switch. The transistor switch formed by the conductive film 123, the dielectric element 132 and the channel element 133 may be functioned as a world line switch. The conductive film 123 may be functioned as a control electrode of the transistor. The dielectric element 132 may be functioned as a gate dielectric of a transistor. The conductive film 123 may be functioned as a word line select line for word lines or a word plane.

The memory device 10 includes one or more pillar structure 160. The pillar structure 160 are arranged separately from each other in the memory array stack 102A of the stack structure 102. The pillar structure 160 extends along the first direction D1 and passes through the memory array stack 102A, the insulating material film 108, the insulating film 121, the insulating film 122, the insulating film 124 and the insulating film 125. The pillar structure 160 includes a first electrode layer 164, an ovonic material layer 161, a second electrode layer 162, a conductive pillar 163 and a landing pad 168. The ovonic material layer 161 is between the first electrode layer 164 and the second electrode layer 162. The second electrode layer 162 is between the conductive pillar 163 and the ovonic material layer 161. The first electrode layer 164 can be on the outer surface of the ovonic material layer 161. The first electrode layer 164 may surround the ovonic material layer 161. The ovonic material layer 161 can be on the outer surface of the second electrode layer 162. The ovonic material layer 161 may surround the second electrode layer 162. The second electrode layer 162 can be on the outer surface of the conductive pillar 163. The second electrode layer 162 may surround the conductive pillar 163. The first electrode layer 164, the ovonic material layer 161 and the second electrode layer 162 may have tubular shapes. The landing pad 168 is on the first electrode layer 164, the ovonic material layer 161, the second electrode layer 162 and the conductive pillar 163. The landing pad 168 is electrically connected to the conductive pillar 163. The conductive pillar 163 can be functioned as a bit line of the memory device 10. In the present embodiment, the upper surface of the pillar structure 160 (or the upper surface of the landing pad 168) is higher than the upper surface 123U of the conductive film 123 in the first direction D1. The pillar structure 160 is electrically connected to the wire 152 through the contact pillar 151.

In other embodiments, the pillar structure 160 may not include the first electrode layer 164 and the second electrode layer 162. In other embodiments, the pillar structure 160 may not include one of the first electrode layer 164 and the second electrode layer 162.

The memory device 10 includes one or more contact pillars 151. The contact pillars 151 are arranged separately from each other. The contact pillar 151 extends along the first direction D1 and passes through the insulating film 126. The contact pillar 151 is on the memory array stack 102A. The contact pillar 151 is on the conductive pillar 163. The contact pillar 151 is on the landing pad 168. The contact pillar 151 can be electrically connected to the conductive pillar 163 through the landing pad 168. In an embodiment, the conductive pillar 163 and the contact pillar 151 may have a one-to-one correspondence. That is, the number of conductive pillars 163 is the same as the number of contact pillar 151, and one contact pillar 151 is disposed on one conductive pillar 163.

The memory device 10 includes a plurality of wires 152. The wires 152 can be disposed along the second direction D2. The wire 152 extends along the third direction D3. The wires 152 are on the insulating film 126. The wire 152 can be electrically connected to the contact pillar 151 and the third pillar portion 130C of the pillar element 130. A portion of the wires 152 is on the staircase stack 102B and the conductive film 123, and electrically connected to the second pillar portion 130B through the third pillar portion 130C of the pillar element 130. A portion of the wires 152 is on the memory array stack 102A and the insulating film 122, and electrically connected to the conductive pillar 163 through the contact pillar 151.

The memory device 10 includes memory cells disposed in the memory array stack 102A. The memory cell can be defined at the intersection of the conductive pillar 163 of the pillar structure 160 and the conductive layer 103 of the memory array stack 102A. The memory cell is electrically connected to the pillar element 130. The conductive pillar 163 is electrically connected to the memory cell and can be functioned as a bit line used to control the memory cell. The conductive layers 103 of the memory array stack 102A and the conductive stair layers 105 of the staircase stack 102B can be functioned as word lines electrically connected to the memory cells. The transistor switch formed by the conductive film 123, the dielectric element 132 an the channel element 133 can be functioned as a word line switch electrically connected to the memory cell.

In an embodiment, the memory device 10 includes a driving circuitry, such as a CMOS circuitry, in an area below the substrate 101. The driving circuitry and stack structure 102 may be on opposite sides of the substrate 101.

Figure 1C:
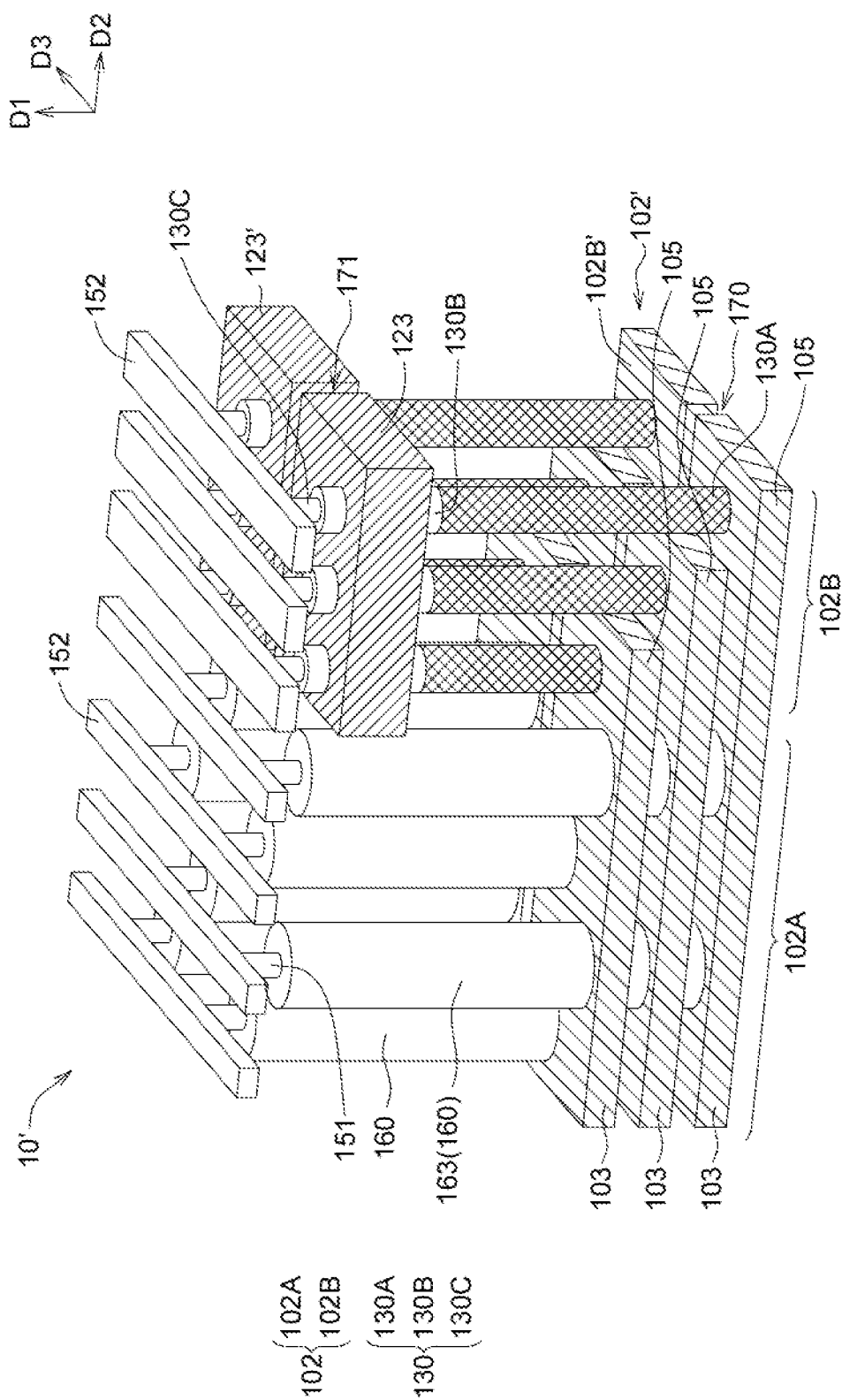
FIG. 1C illustrates a schematic stereoscopic view of a memory device according to another embodiment of the present disclosure.

FIG. 1A illustrates a stack structure (e.g. the stack structure 102), but the present disclosure is not limited thereto. The memory device may include one or more stack structures as shown in FIG. 1C. FIG. 1C illustrates a schematic stereoscopic view of a memory device 10' including stack structures according to another embodiment of the present disclosure.

The memory device 10' includes a stack structure 102 and a stack structure 102'. The stack structure 102 may be adjacent to the stack structure 102'. The stack structure 102 and the stack structure 102' can be disposed along the third direction D3. The stack structure 102' includes a conductive film 123 and a conductive film 123'. The conductive film 123 can be adjacent to the conductive film 123'. The conductive film 123 and the conductive film 123' can be disposed along the third direction D3. In this embodiment, the memory device 10' include a trench 170 and a trench 171. The trench 170 extends along the second direction D2. The stack structure 102 is separated from the stack structure 102' by the trench 170. The trench 171 extends along the second direction D2. The conductive film 123 is separated from the conductive film 123' by the trench 171. In an embodiment, insulating materials can be filled in the trench 170 and the trench 171 to form insulating strips. The structure of the stack structure 102' may be similar to the structure of the stack structure 102. The memory array stack 102A of the stack structure 102 may be adjacent to the memory array stack of the stack structure 102'. The staircase stack 102B of the stack structure 102 may be adjacent to the staircase stack 102B' of the stack structure 102'. In the first direction D1, the conductive film 123 may overlap the staircase stack 102B of the stack structure 102, and the conductive film 123' may overlap the staircase stack 102B' of the stack structure 102'.

Similar to the memory device 10, the memory device 10' further includes a substrate, an insulating material film, insulating films on the stack structure 102 and the stack structure 102', at least one pillar element 130, at least one contact pillar 151, wires 152 and at least one pillar structure 160. The structures of the substrate, the insulating material film, the insulating films on the stack structure 102 and the stack structure 102', and the pillar structure 160 can be similar to the structures of the substrate 101, the insulating material film 108, the insulating films 121, 122, 124, 125 and 126, and the pillar structure 160 of the memory device 10 respectively, as shown in FIGS. 1A and 1B. The pillar element 130 on the stack structure 102 can be electrically connected to the pillar element 130 on the stack structure 102'. The conductive pillar 163 of the pillar structure 160 in the stack structure 102 can be electrically connected to the conductive pillar 163 of the pillar structure 160 in the stack structure 102'. The memory device 10' has a higher storage density.

In other embodiments, the memory device of the present disclosure includes more than two stack structures, and the structure of the memory device can be illustrated by analogy with the memory device 10 and the memory device 10' shown in in FIGS. 1A to 1C.

Figure 1D:
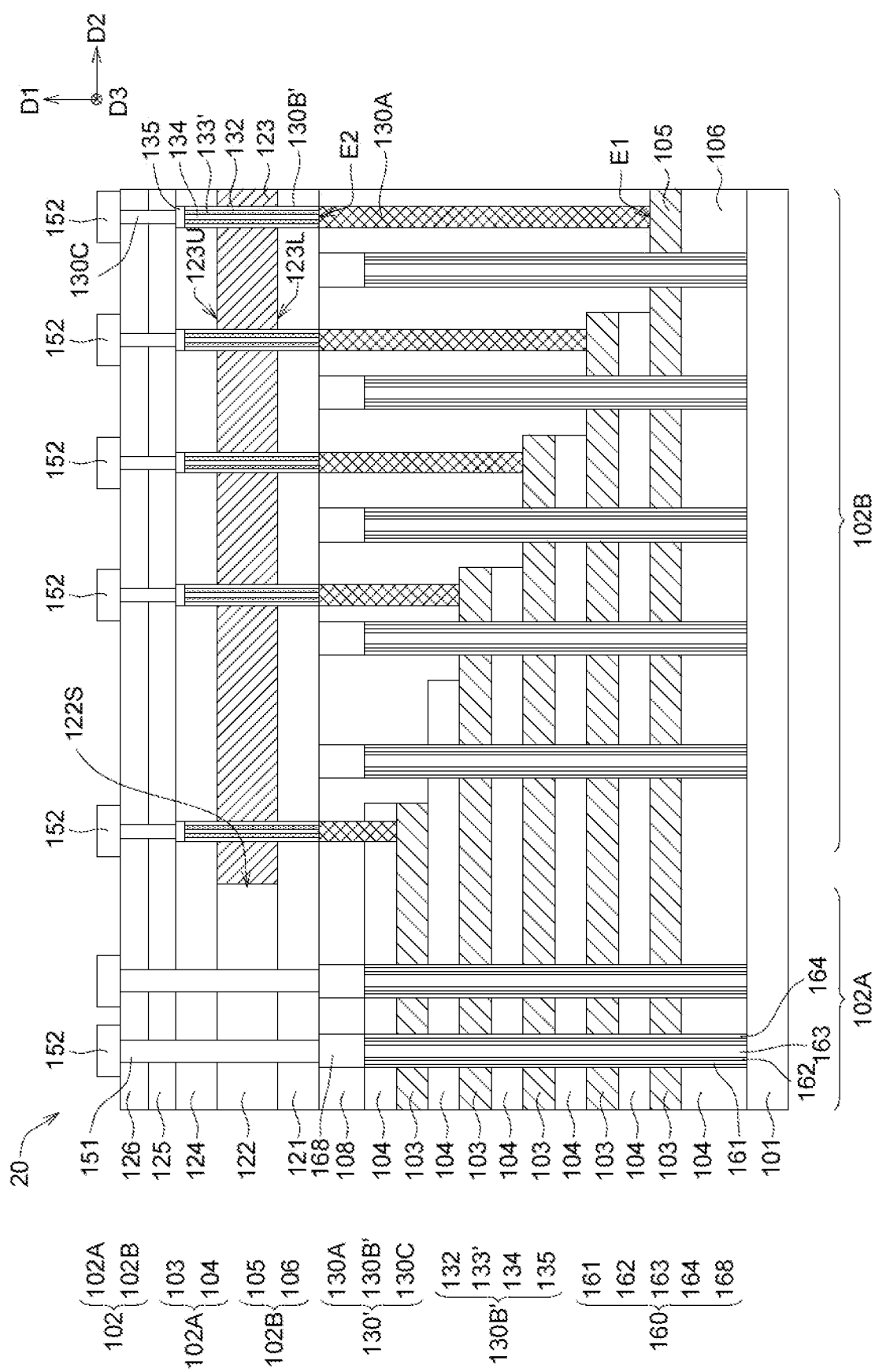
FIG. 1D illustrates a schematic cross-sectional view of a memory device according to yet another embodiment of the present disclosure.
Figure 1E:
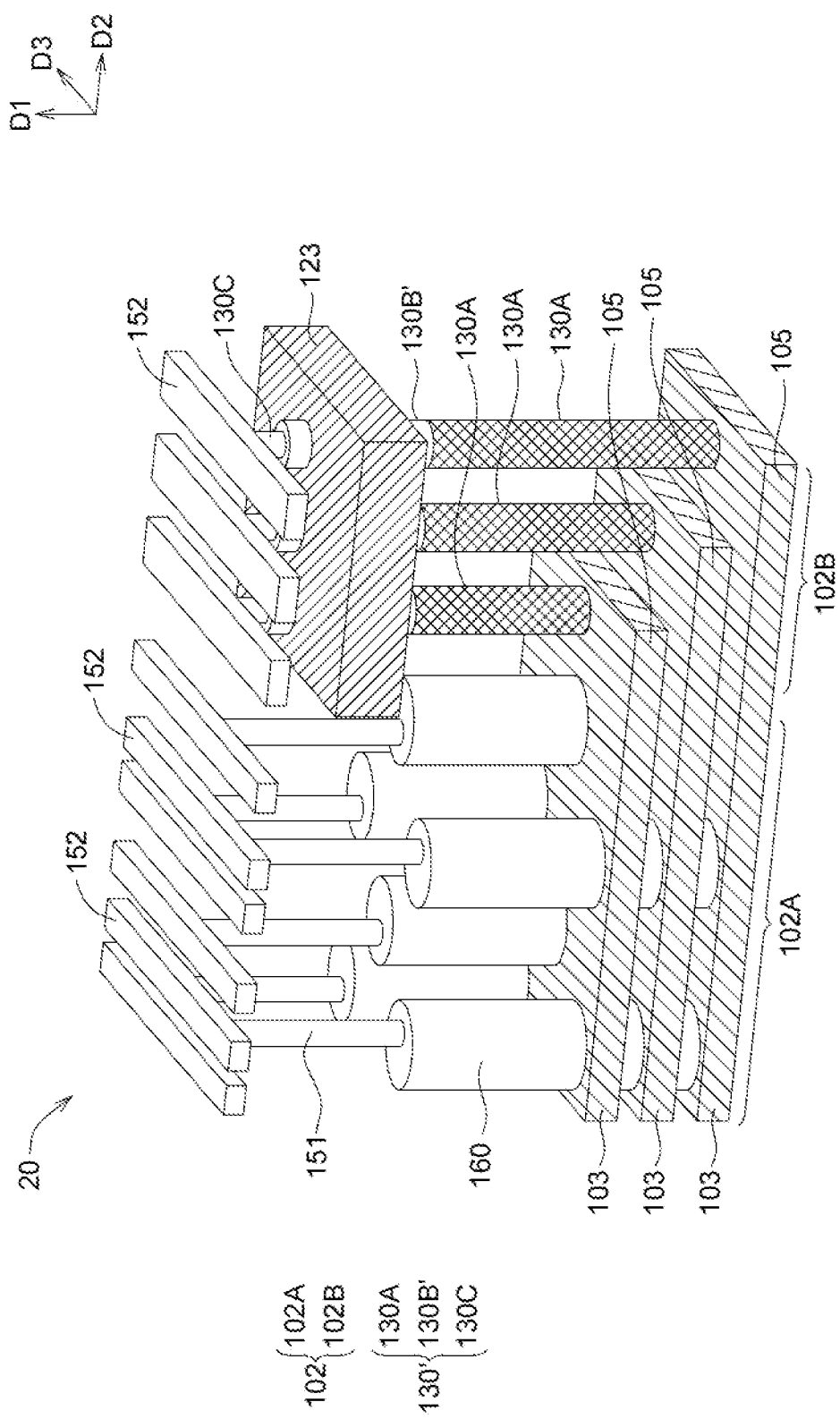
FIG. 1E illustrates a schematic stereoscopic view of a memory device according to yet another embodiment of the present disclosure.

Referring to FIGS. 1D and 1E, FIG. 1D illustrates a schematic cross-sectional view of a memory device 20 according to an embodiment of the present disclosure, and FIG. 1E illustrates a schematic stereoscopic view of the memory device 20 according to an embodiment of the present disclosure. To keep the illustration simple and clear, some elements shown in FIG. 1D are omitted in FIG. 1E, and the numbers of the same components in FIGS. 1D and 1E may be different. The memory device 20 may be a three-dimensional ovonic threshold switch (OTS) memory. The differences between the memory device 20 shown in FIGS. 1D to 1E and the memory device 10 shown in FIGS. 1A to 1B are described below. The memory device 20 includes pillar structures 160. A portion of the pillar structures 160 passes through the staircase stack 102B, and another portion of the pillar structures 160 passes through the memory array stack 102A. The pillar structures 160 in the staircase stack 102B may be electrical floating, and therefore regarded as dummy pillar structures. The pillar structures 160 can be used as a support element. The pillar structures 160 in the memory array stack 102A may not passes through the insulating films 121, 122, 124 and 125.

The contact pillar 151 extends along the first direction D1 and passes through the insulating films 121, 122, 124, 125 and 126. The contact pillar 151 is electrically connected to the pillar structure 160 in the memory array stack 102A. In the present embodiment, the upper surface of the pillar structure 160 (or the upper surface of the landing pad 168) is lower than the lower surface 123L of the conductive film 123 in the first direction D1. The pillar element 130' of the memory device 20 includes a first pillar portion 130A, a second pillar portion 130B' and a third pillar portion 130C. The second pillar portion 130B' includes a dielectric element 132, a channel element 133', a dielectric pillar 134 and a pad 135. The material of the channel element 133' of the second pillar portion 130B' of the memory device 20 can be different from or the same as the material of the channel element 133 of the second pillar portion 130B of the memory device 10.

The following descriptions will take the memory device 10 of FIGS. 1A to 1B as an example to illustrate a method for operating a memory device according to an embodiment of the present disclosure. The method for operating the memory device 10 may include the steps of selecting a specific memory cell from memory cells in the memory device 10 and turning on the selected memory cell, and the operation procedures of reading (READ operation procedure), programming (or can be understood as SET operation procedure) or erasing (or can be understood as RESET operation procedure) can be performed to the selected memory cell. The method for operating the memory device 10 may include the step of turning off the unselected memory cells of the memory cells in the memory device 10.

The step of turning on the selected memory cell includes: applying a word line voltage to a word line of the plurality of word lines (such as the conductive layers 103 of the memory array stack 102A and the conductive stair layers 105 of the staircase stack 102B) electrically connected to a selected memory cell of the memory cells, applying a control voltage to a word line switch of the plurality of word line switches (such as the transistor switches formed by the conductive films 123, the dielectric elements 132 and the channel elements 133) electrically connected to the selected memory cell, and applying a bit line voltage to a bit line of the plurality of bit lines (such as the conductive pillars 163) electrically connected to the selected memory cell to turn on the selected memory cell. Applying the control voltage to the word line switch electrically connected to the selected memory cell causes the word line electrically connected to the selected memory cell to be turned on. Applying the control voltage to the word line switch electrically connected to the selected memory cell will not cause the plurality of bit lines to be turned on or turned off since the conductive pillar 163 of the memory device 10 does not pass through the conductive film 123. In the method for operating the memory device 10, applying the control voltage to the word line switch will not simultaneously change the conductive state (ON or OFF state) of the word line switch and the bit line. The word line switch and bit line can be controlled independently.

The step of turning off the unselected memory cell includes: applying a ground voltage to word lines of the plurality of word lines (such as the conductive layers 103 of the memory array stack 102A and the conductive stair layers 105 of the staircase stack 102B) electrically connected to unselected memory cells of the memory cells, apply a ground control voltage to word line switches of the plurality of word line switches (such as the transistor switches formed by the conductive films 123, the dielectric elements 132 and the channel elements 133) electrically connected to the unselected memory cells, and applying a ground voltage to bit lines of the plurality of bit lines (such as the conductive pillars 163) electrically connected to the unselected memory cells to turn off the unselected memory cells.

For example, the memory device of the present disclosure can be operated by applying the voltages listed in TABLE 1 to the memory device. As shown in TABLE 1, in RESET operation procedure, ½Vs (bit line voltage) is applied to the bit line electrically connected to the selected memory cell, −½Vs (word line voltage) is applied to the word line electrically connected to the selected memory cell, and Vs+1 (control voltage) is applied to the word line switch electrically connected to the selected memory cell to turn on the selected memory cell; 0 V (ground voltage) can be applied to bit lines electrically connected to the unselected memory cells, 0 V (ground voltage) can be applied to the word lines electrically connected to the unselected memory cells, 0 V (ground voltage) can be applied to the word line switches electrically connected to the unselected memory cells to turn off the unselected memory cells. As shown in TABLE 1, in SET operation procedure, −½Vs (bit line voltage) is applied to the bit line electrically connected to the selected memory cell, ½Vs (word line voltage) is applied to the word line electrically connected to the selected memory cell, and Vs+1 (control voltage) is applied to the word line switch electrically connected to the selected memory cell to turn on the selected memory cell; 0 V (ground voltage) can be applied to bit lines electrically connected to the unselected memory cells, 0 V (ground voltage) can be applied to the word lines electrically connected to the unselected memory cells, 0 V (ground voltage) can be applied to the word line switches electrically connected to the unselected memory cells to turn off the unselected memory cells. As shown in TABLE 1, in READ operation procedure, ½Vr (bit line voltage) is applied to the bit line electrically connected to the selected memory cell, −½Vr (word line voltage) is applied to the word line electrically connected to the selected memory cell, and Vs+1 or Vr+1 (control voltage) is applied to the word line switch electrically connected to the selected memory cell to turn on the selected memory cell; 0 V (ground voltage) can be applied to bit lines electrically connected to the unselected memory cells, 0 V (ground voltage) can be applied to the word lines electrically connected to the unselected memory cells, 0 V (ground voltage) can be applied to the word line switches electrically connected to the unselected memory cells to turn off the unselected memory cells. Vs can be between 2.5 V and 9 V, for example, Vs is 5 V. Vr can be between 1 V and 6 V, for example, Vr is 3 V. As shown in TABLE 1, the bias direction of the voltage (e.g. first bit line voltage; ½Vs) applied to the bit line electrically connected to the selected memory cell in RESET operation procedure is opposite to the bias direction of the voltage (e.g. second bit line voltage; −½Vs) applied to the bit line electrically connected to the selected memory cell in SET operation procedure. The bias direction of the voltage (e.g. word line voltage; −½Vs) applied to the word line electrically connected to the selected memory cell in RESET operation procedure is opposite to the bias direction of the voltage (e.g. word line voltage; ½Vs) applied to the word line electrically connected to the selected memory cell in SET operation procedure.

TABLE 1

|  | RESET | SET | READ |
|---|---|---|---|
| bit line electrically connected to the selected memory cell | ½ Vs | −½ Vs | ½ Vr |
| bit lines electrically connected to the unselected memory cells | 0 V | 0 V | 0 V |
| word line electrically connected to the selected memory cell | −½ Vs | ½ Vs | −½ Vr |
| word lines electrically connected to the unselected memory cells | 0 V | 0 V | 0 V |
| word line switch electrically connected to the selected memory cell | Vs + 1 | Vs + 1 | Vs + 1 or Vr + 1 |
| word line switches electrically connected to the unselected memory cells | 0 V | 0 V | 0 V |

The memory device of the present disclosure does not include a bit line switch that shares a control electrode with the word line switch, so that applying a voltage to the control electrode of the word line switch during the operation of the memory device will not affect the conductive state (ON or OFF state) of the bit line. By applying voltages to the bit line, word line and word plane (word line switch) respectively, specific memory cell in the memory device can be selected, and the operation procedures of reading (READ), programming (or can be understood as SET operation procedure) or erasing (or can be understood as RESET operation procedure) can be performed to the selected memory cell.

FIGS. 2 to 16 illustrate a method for manufacturing a memory device according to an embodiment of the present disclosure.

Figure 2:
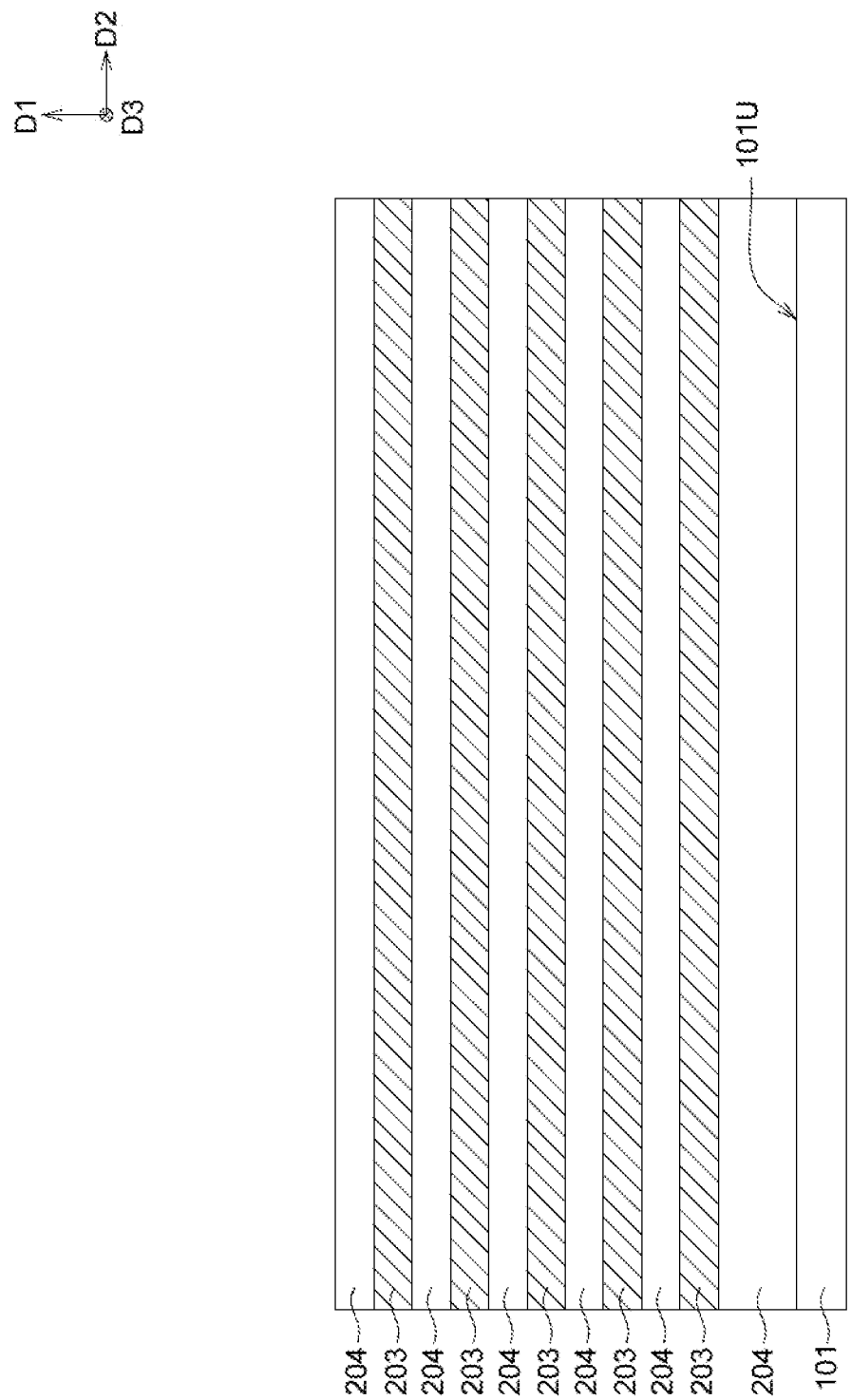
FIGS. 2 to 16 illustrate a method for manufacturing a memory device according to an embodiment of the present disclosure.

Referring to FIG. 2, FIG. 2 shows one stage of the method for manufacturing the memory device. A substrate 101 is provided. Conductive material layers 203 and insulating material layers 204 stacked alternately along the first direction D1 are formed on an upper surface 101U of the substrate 101. The first direction D1 may be the normal direction of the upper surface 101U of the substrate 101. In an embodiment, the conductive material layers 203 and insulating material layers 204 are formed on the upper surface 101U of the substrate 101 through a deposition process. The thickness of the lowest insulating material layer 204 among the insulating material layers 204 in the first direction D1 may be greater than the thickness of the other insulating material layer 204 in the first direction D1. The topmost insulating material layer 204 among the insulating material layers 204 may be a hard mask layer. The substrate 101 may include a doped or undoped semiconductor material, a dielectric material or a conductive material. In an embodiment, the substrate 101 is a doped or undoped silicon substrate. In an embodiment, the substrate 101 is an inter-metal dielectric layer (IMD) formed through back end of line process (BEOL) or an interlayer dielectric layer (ILD). The conductive material layer 203 may include a conductive material, such as carbon, titanium nitride, highly doped polycrystalline silicon (such as N+ polycrystalline silicon or P+ polycrystalline silicon), tantalum nitride, cobalt, silicon germanium alloy ($SiGe_x$), ruthenium, nickel or aluminum. The insulating material layer 204 may include oxide such as silicon oxide.

Figure 3:
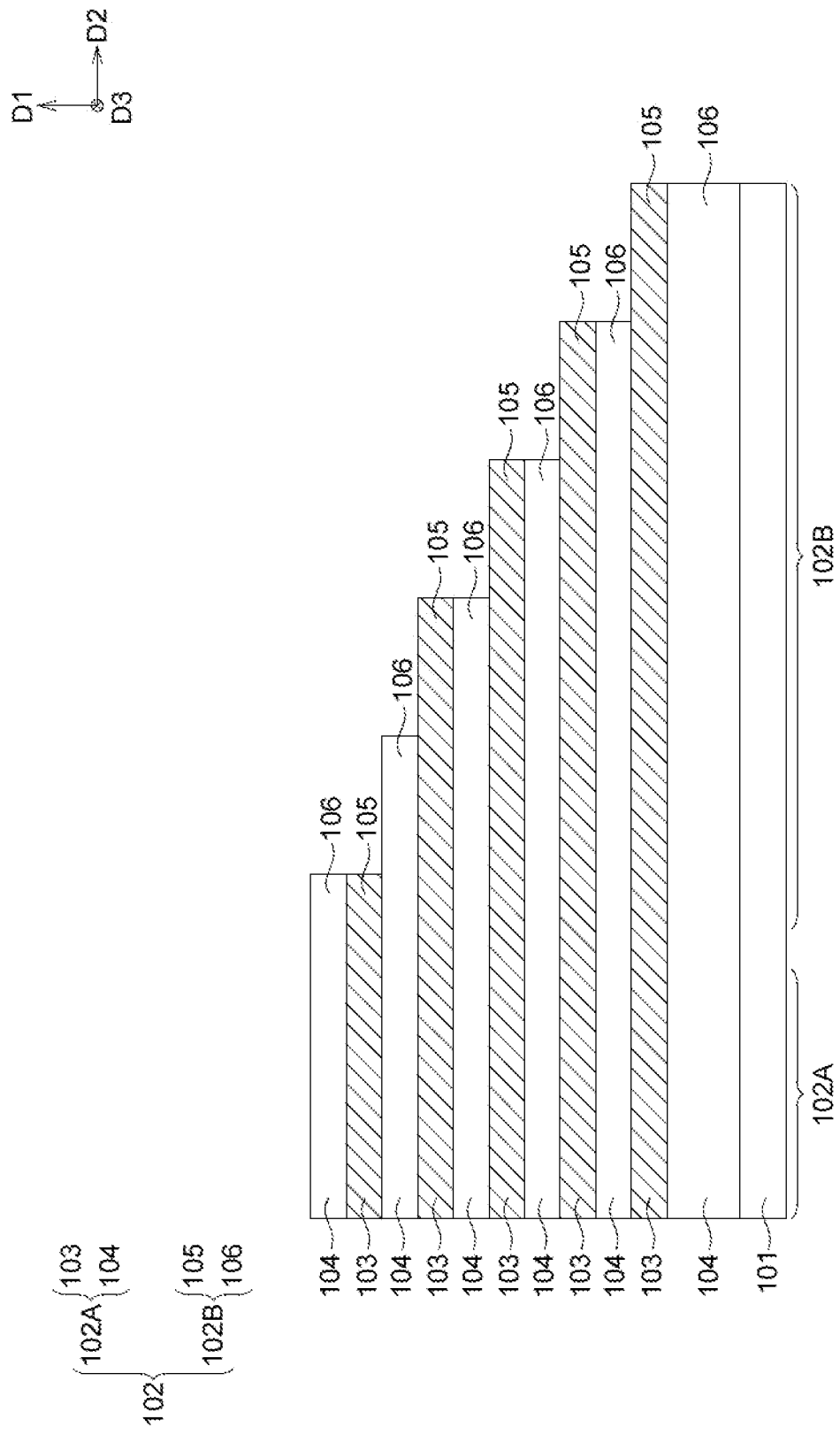

Referring to FIG. 3, FIG. 3 shows one stage of the method for manufacturing the memory device. A stack structure 102 is formed on the substrate 101. In an embodiment the conductive material layers 203 and the insulating material layers 204 shown in FIG. 2 are patterned through an etching process so as to form the stack structure 102 including a memory array stack 102A and a staircase stack 102B. A portion of the conductive material layer 203 defined in the memory array stack 102A is the conductive layer 103. A portion of the conductive material layer 203 defined in the staircase stack 102B is the conductive stair layer 105. A portion of the insulating material layer 204 defined in the memory array stack 102A is the insulating layer 104. A portion of the insulating material layer 204 defined in the staircase stack 102B is the insulating stair layers 106.

Figure 4:
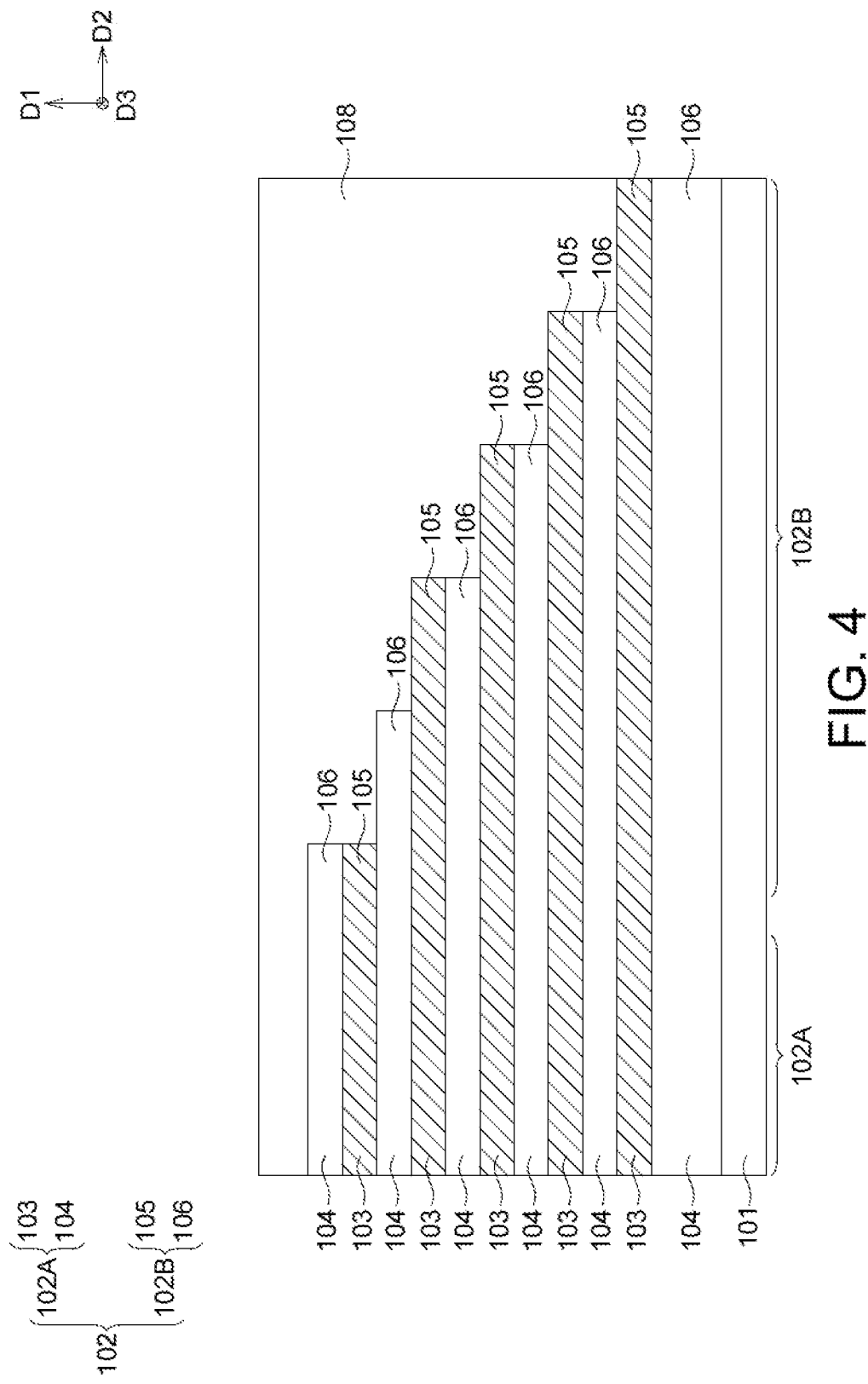

Referring to FIG. 4, FIG. 4 shows one stage of the method for manufacturing the memory device. An insulating material film 108 is formed on the stack structure 102. In an embodiment, the insulating material film 108 is formed on the stack structure 102 through a deposition process. The insulating material film 108 may include oxide such as silicon oxide.

Figure 5:
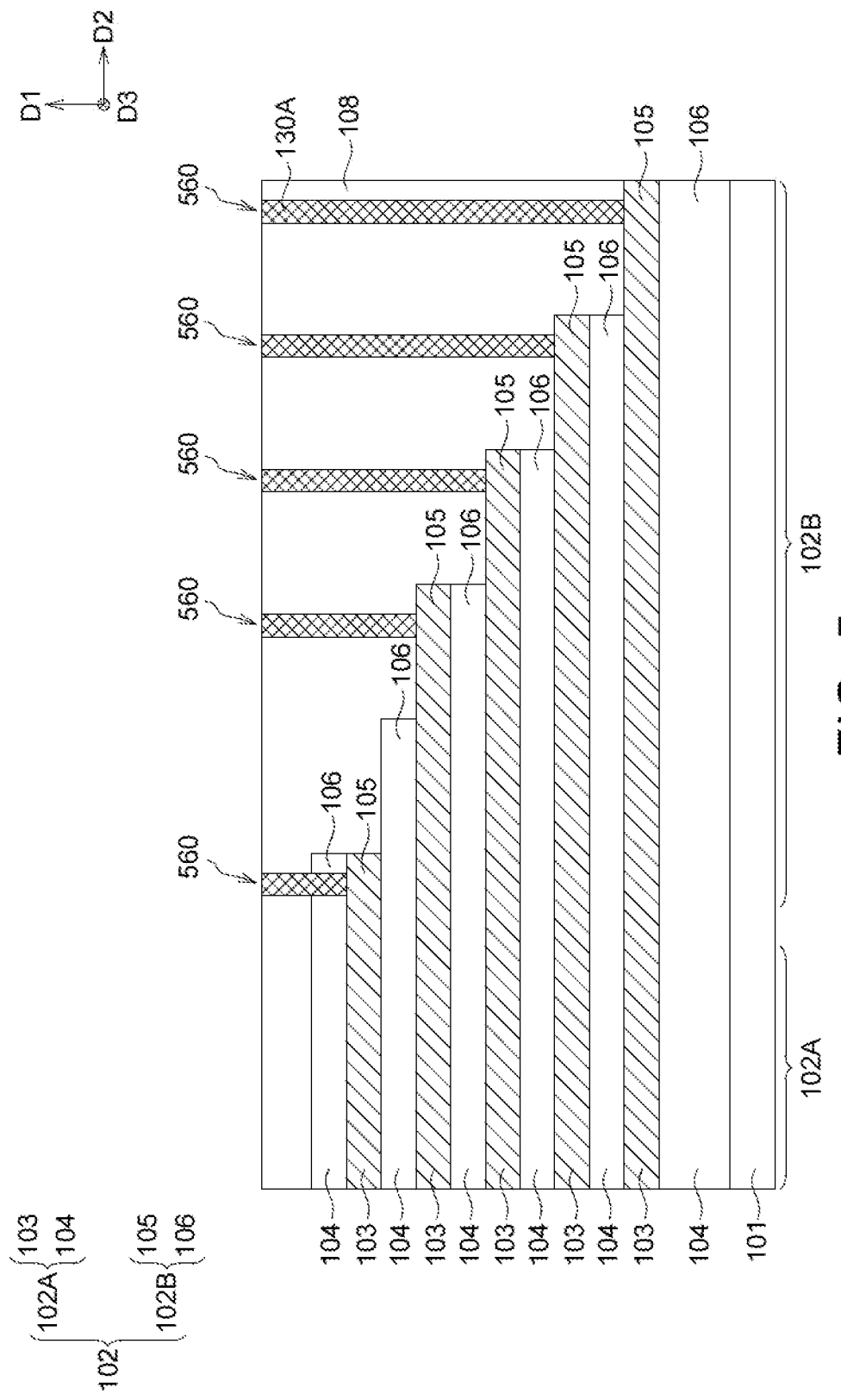

Referring to FIG. 5, FIG. 5 shows one stage of the method for manufacturing the memory device. First pillar portions 130A are formed. The first pillar portions 130A are arranged separately from each other on the staircase stack 102B. The first pillar portion 130A extends along the first direction D1 and passes through the insulating material film 108. The first pillar portion 130A is electrically connected to the conductive stair layer 105 of the staircase stack 102B. In an embodiment, a portion of the staircase stack 102B and a portion of the insulating material film 108 are removed through an etching process to form holes 560. The holes 560 are arranged separately from each other in the insulating material film 108. The sidewalls of the insulating material film 108 and the upper surfaces of the conductive stair layers 105 are exposed by the holes 560. A conductive material may be filled in the holes 560 through a deposition process to form the first pillar portions 130A. The conductive material of the first pillar portion may include tungsten. In an embodiment, a barrier film can be formed on the sidewall of the insulating material film 108 exposed by the hole 560 through a deposition process before the conductive material is filled in the hole 560. The barrier layer may include titanium nitride. In an embodiment, a planarization process, such as a chemical-mechanical planarization process, can be performed to the conductive material after the conductive material is filled in the holes 560.

Figure 6:
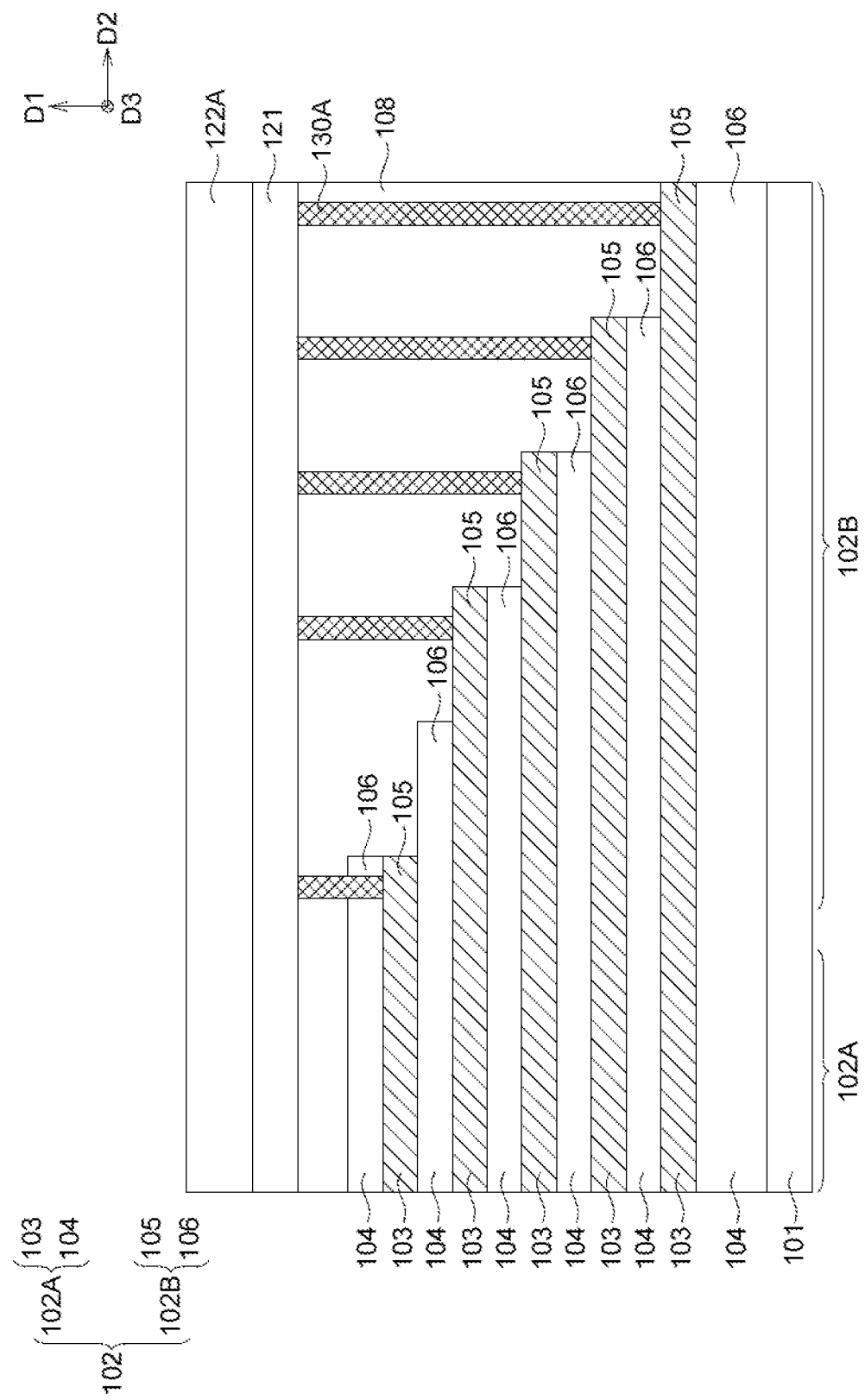

Referring to FIG. 6, FIG. 6 shows one stage of the method for manufacturing the memory device. A insulating film 121 and an insulating film 122A are formed. In an embodiment, the insulating film 121 and the insulating film 122A can be sequentially formed on the insulating material film 108 and the first pillar portions 130A. The insulating film 121 and the insulating film 122A may include insulating materials, such as silicon oxide, lithium titanium oxide (LTO), silicon nitride, hafnium oxide (HfO$_x$), zirconium hafnium oxide (HfZrO$_x$) or silicon oxynitride (SiON$_x$).

Figure 7:
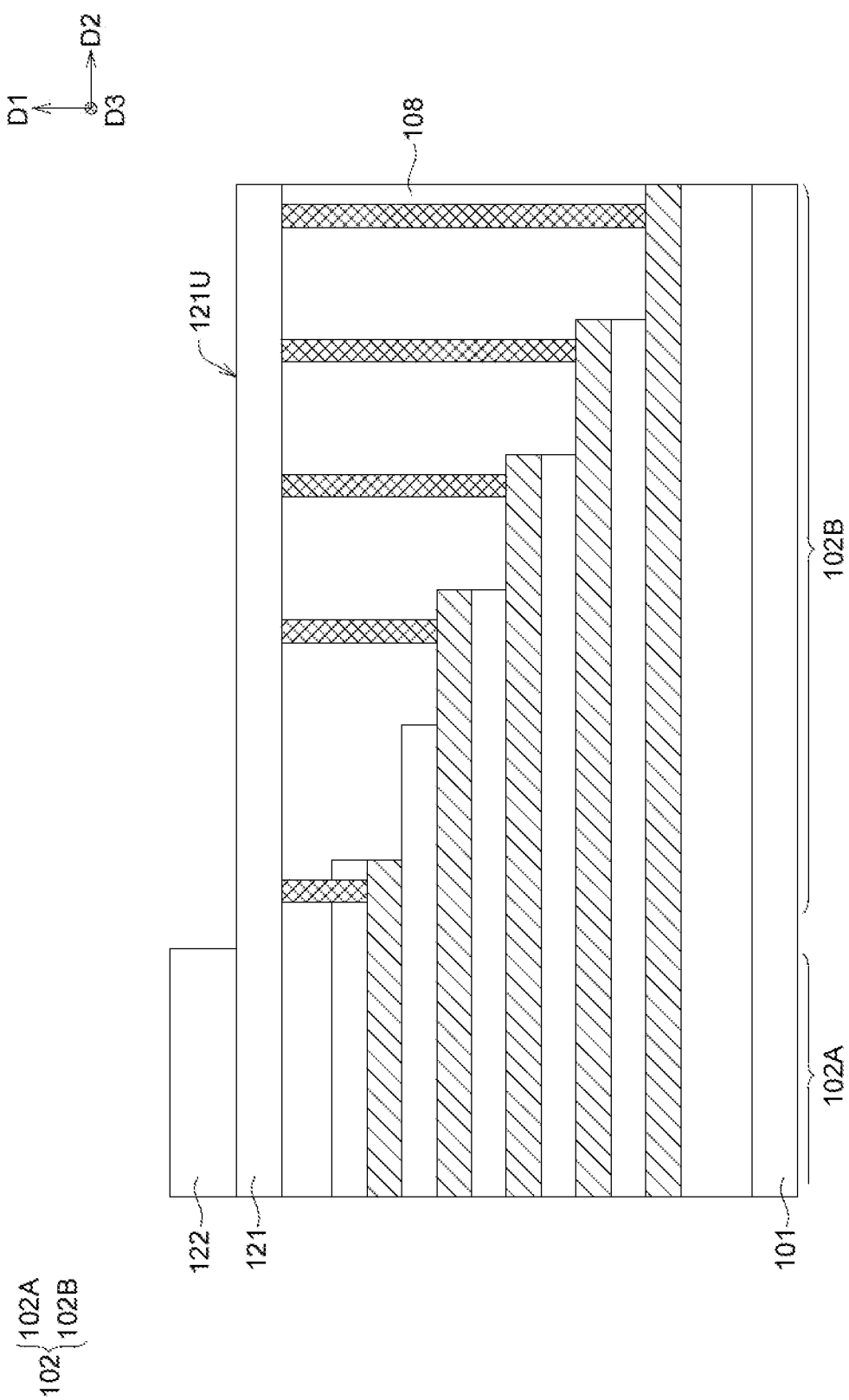

Referring to FIG. 7, FIG. 7 shows one stage of the method for manufacturing the memory device. An insulating film 122 is formed. In an embodiment, a portion of the insulating film 122A is removed through an etching process to expose a portion of the upper surface 121U of the insulating film 121, and the remained portion of the insulating film 122A is the insulating film 122.

Figure 8:
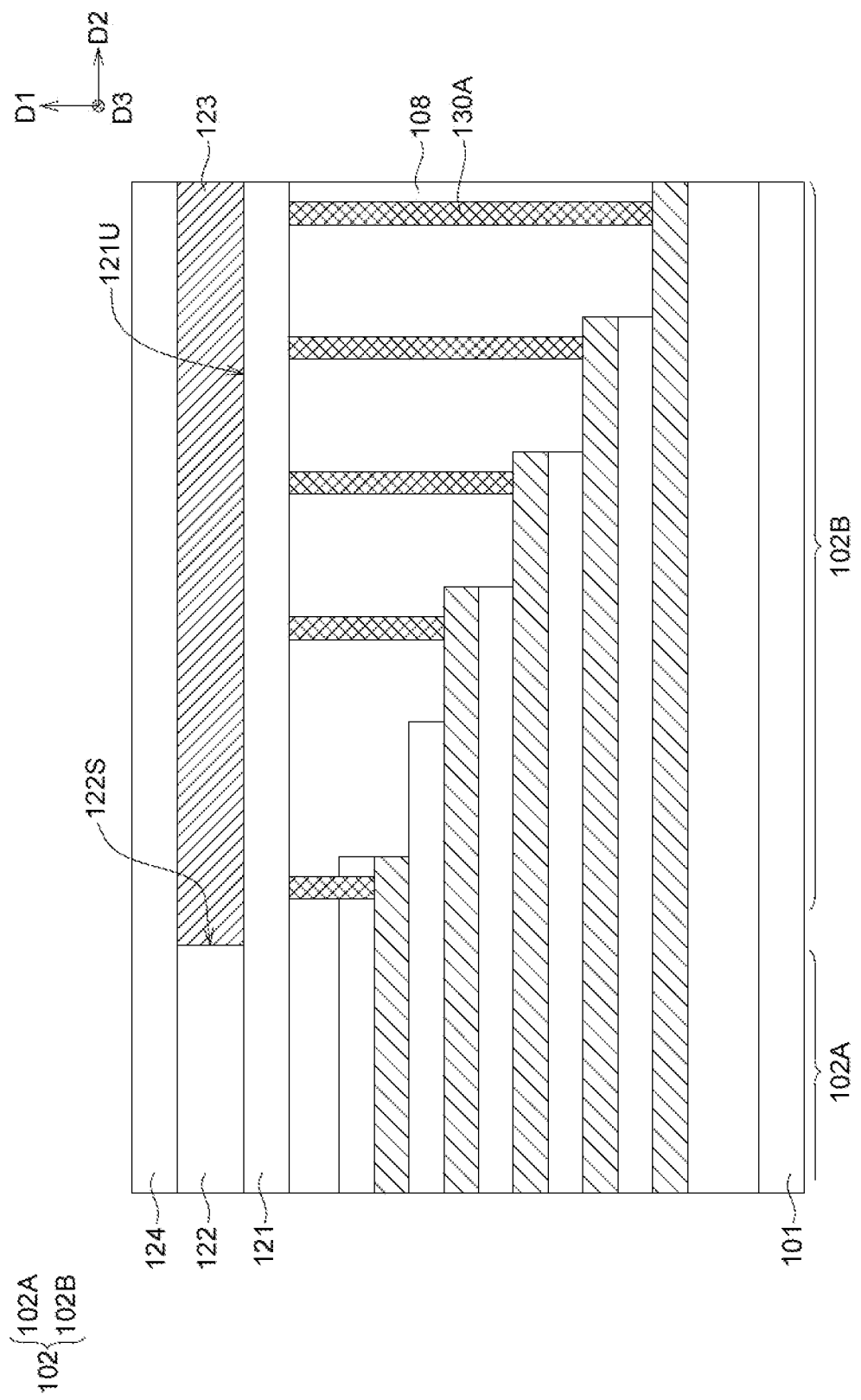

Referring to FIG. 8, FIG. 8 shows one stage of the method for manufacturing the memory device. A conductive film 123 and an insulating film 124 are formed. In an embodiment, the conductive film 123 is formed on the upper surface 121U of the insulating film 121 and the sidewall 122S of the insulating film 122 through a deposition process, and then the insulating film 124 is formed on the insulating film 122 and the conductive film 123 through a deposition process. The conductive film 123 may include a conductive material, such as tungsten, titanium nitride, tantalum nitride, ruthenium, cobalt, nickel, aluminum, doped polycrystalline silicon, silicon germanium (SiGe$_x$), or carbon. Doped polycrystalline silicon may include N+ polycrystalline silicon and P+ polycrystalline silicon. In an embodiment, the conductive film 123 includes tungsten and titanium nitride. The insulating film 124 may include an insulating material, such as silicon oxide, lithium titanium oxide (LTO), silicon nitride, hafnium oxide (HfO$_x$), zirconium hafnium oxide (HfZrO$_x$) or silicon oxynitride (SiON$_x$).

Figure 9:
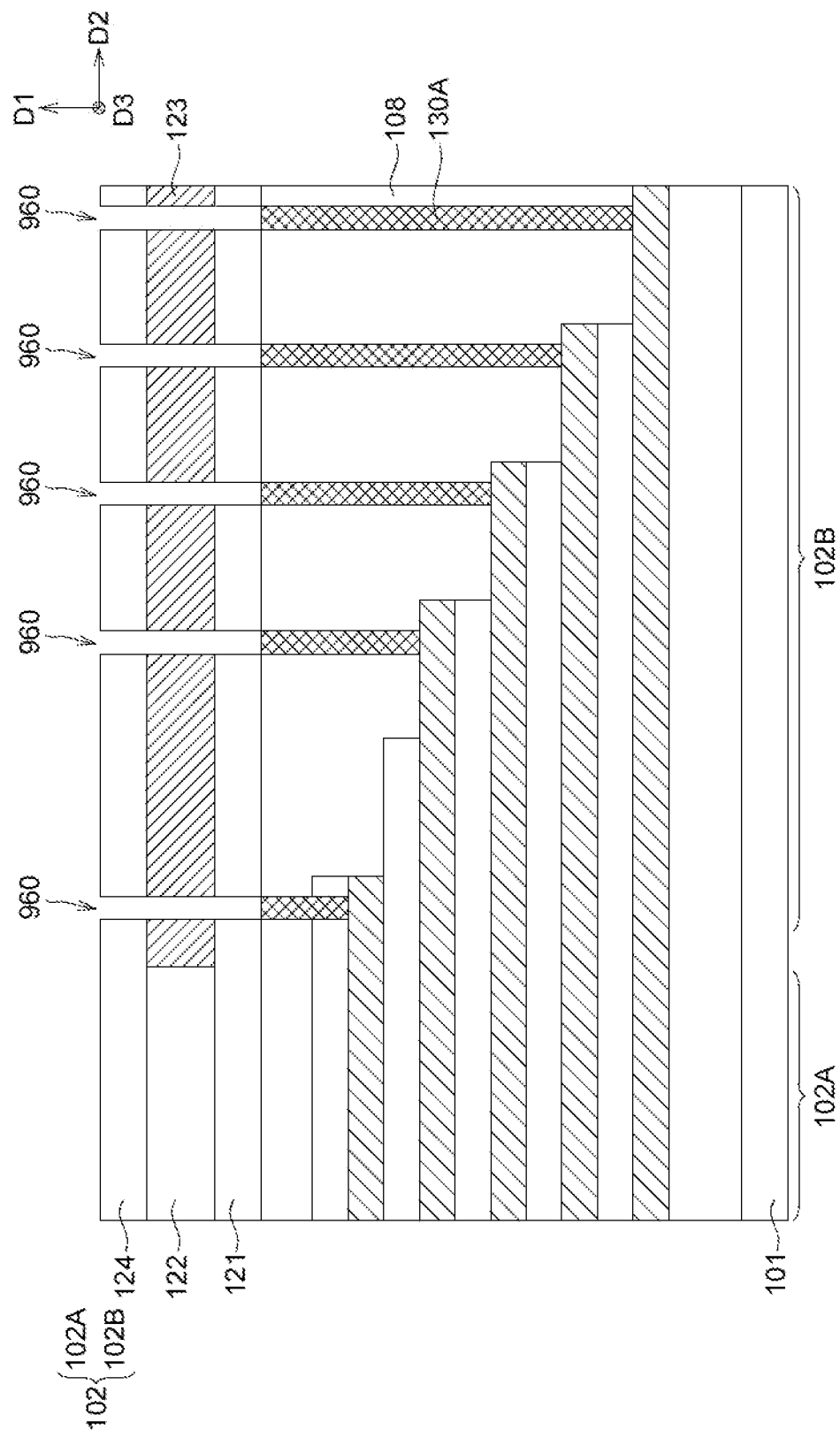

Referring to FIG. 9, FIG. 9 shows one stage of the method for manufacturing the memory device. Holes 960 are formed. The holes 960 are arranged separately from each other in the conductive film 123. The hole 960 extends along the first direction D1 and passes through the insulating film 124, the conductive film 123 and the insulating film 121. The upper surfaces of the first pillar portions 130A, the sidewalls of the insulating film 121, the sidewalls of the conductive film 123 and the sidewalls of the insulating film 124 are exposed by the holes 960. The positions of the holes 960 can correspond to the positions of the first pillar portions 130A. In an embodiment, a portion of the insulating film 124, a portion of the conductive film 123 and a portion of the insulating film 121 are removed through an etching process to form the holes 960.

Figure 10:
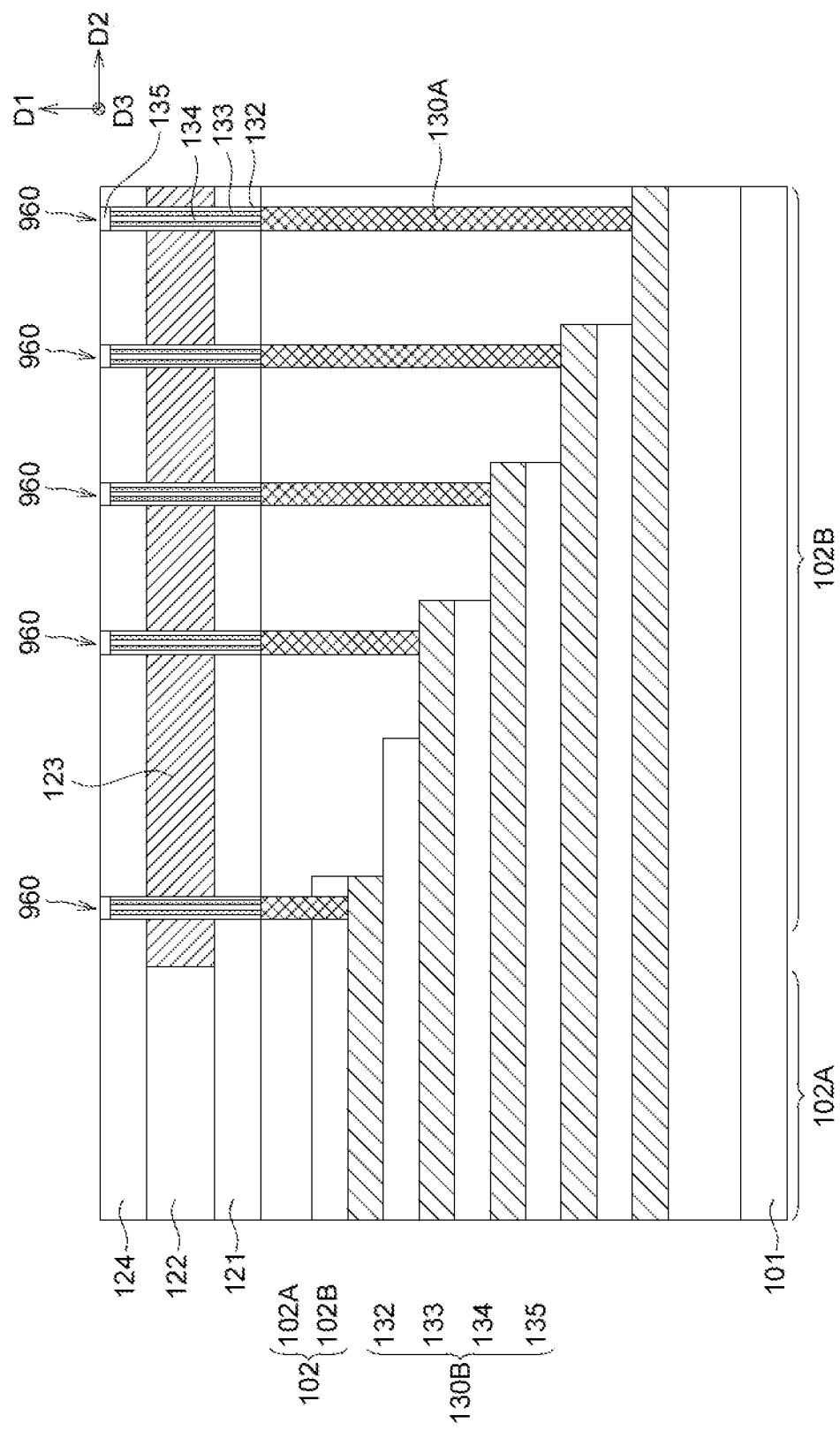

Referring to FIG. 10, FIG. 10 shows one stage of the method for manufacturing the memory device. Second pillar portions 130B are formed. In an embodiment, a gate dielectric can be filled in the holes 960 through a deposition process, and a portion of the gate dielectric can be removed through a anisotropic etching process to form a dielectric element 132. A channel element 133 is formed on the sidewall of the dielectric element 132 through a deposition process. A dielectric pillar 134 is formed on the sidewall of the channel element 133 through a deposition process. The dielectric pillar 134 may fills the space surrounded by the channel element 133. A pad 135 is formed on the upper surface of the dielectric element 132, the upper surface of the channel element 133 and the upper surface of the dielectric pillar 134 through a deposition process. Therefore, the second pillar portion 130B including the dielectric element 132, the channel element 133, the dielectric pillar 134 and the pad 135 are formed. The gate dielectric may include a dielectric material, such as silicon oxide, lithium titanium oxide (LTO), silicon nitride, hafnium oxide (HfO$_x$), zirconium hafnium oxide (HfZrO$_x$) or silicon oxynitride (SiON$_x$). The channel element 133 may include doped polycrystalline silicon or undoped polycrystalline silicon or indium gallium zinc oxide (IGZO). The dielectric pillar 134 may include oxide such as silicon oxide. The pad 135 may include a conductive material.

Figure 11:
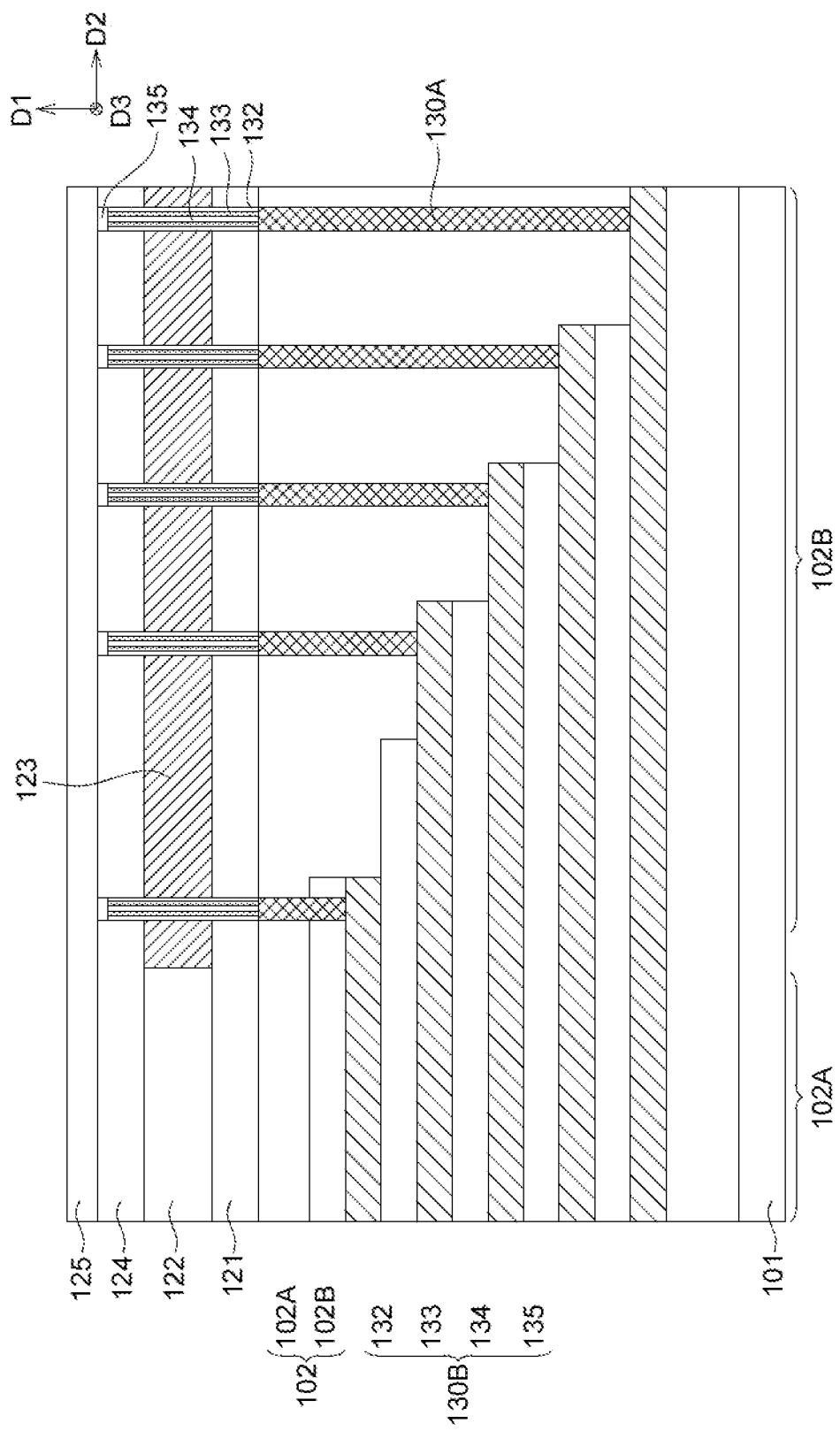

Referring to FIG. 11, FIG. 11 shows one stage of the method for manufacturing the memory device. An insulating film 125 is formed. In an embodiment, the insulating film 125 can be formed on the insulating film 124 and the second pillar portions 130B through a deposition process. The insulating film 125 may include an insulating material, such as silicon oxide, lithium titanium oxide (LTO), silicon nitride, hafnium oxide (HfO$_x$), zirconium hafnium oxide (HfZrO$_x$) or silicon oxynitride (SiON$_x$).

Figure 12:
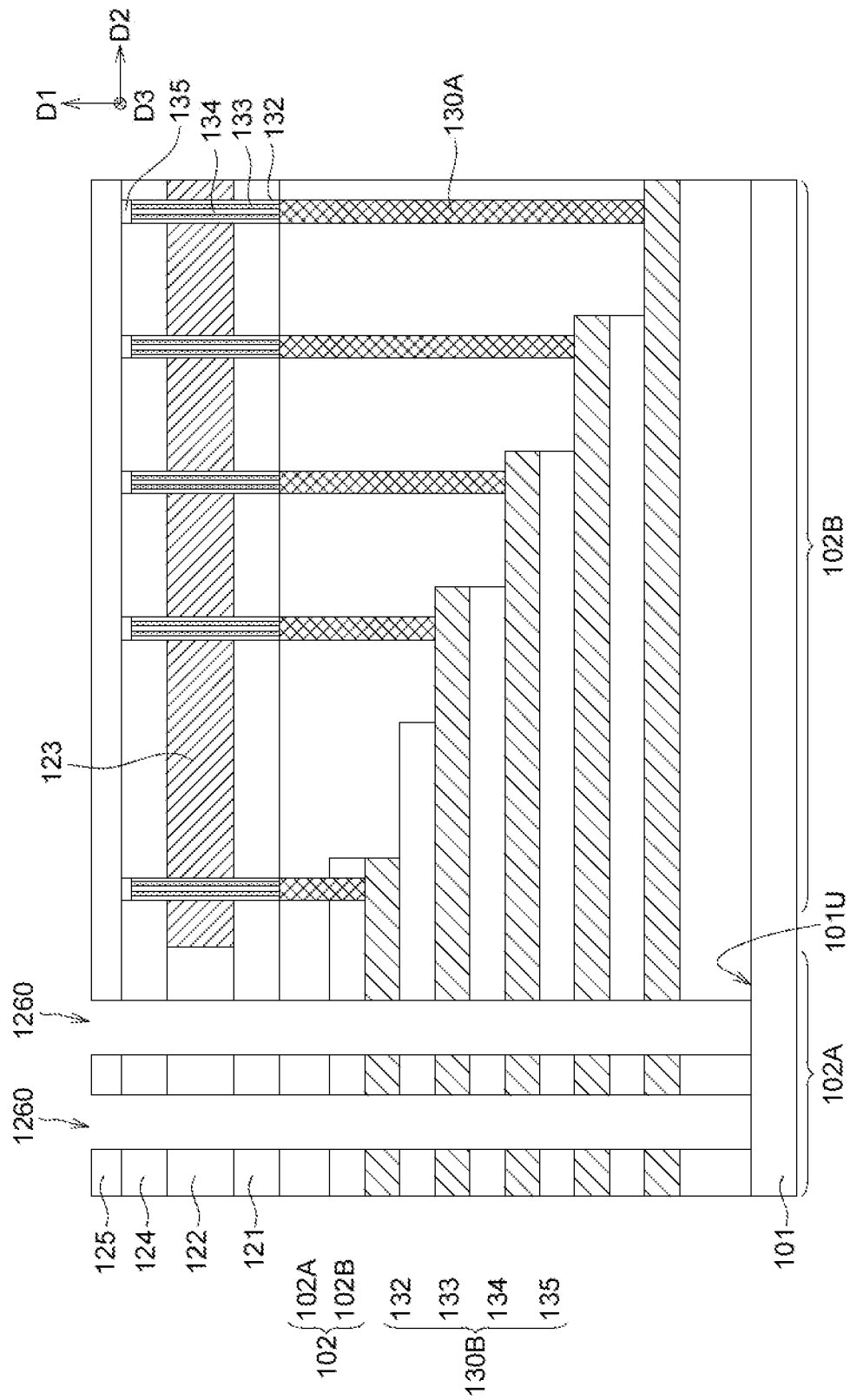

Referring to FIG. 12, FIG. 12 shows one stage of the method for manufacturing the memory device. Holes 1260 are formed. The holes 1260 are arranged separately from each other in the memory array stack 102A of the stack structure 102. The hole 1260 extends along the first direction D1 and passes through the insulating film 125, the insulating film 124, the insulating film 122, the insulating film 121, the insulating material film 108 and the memory array stack 102A. A portion of the upper surface 101U of the substrate 101, the sidewalls of the memory array stack 102A, the sidewalls of the insulating material film 108, the sidewalls of the insulating film 121, the sidewalls of the insulating film 122, the sidewalls of the insulating film 124 and the sidewalls of the insulating film 125 are exposed by the holes 1260. In an embodiment, a portion of the insulating film 125, a portion of the insulating film 124, a portion of the insulating film 122, a portion of the insulating film 121, a portion of the insulating material film 108 and a portion of the memory array stack 102A are removed through an etching process to form the holes 1260.

Figure 13:
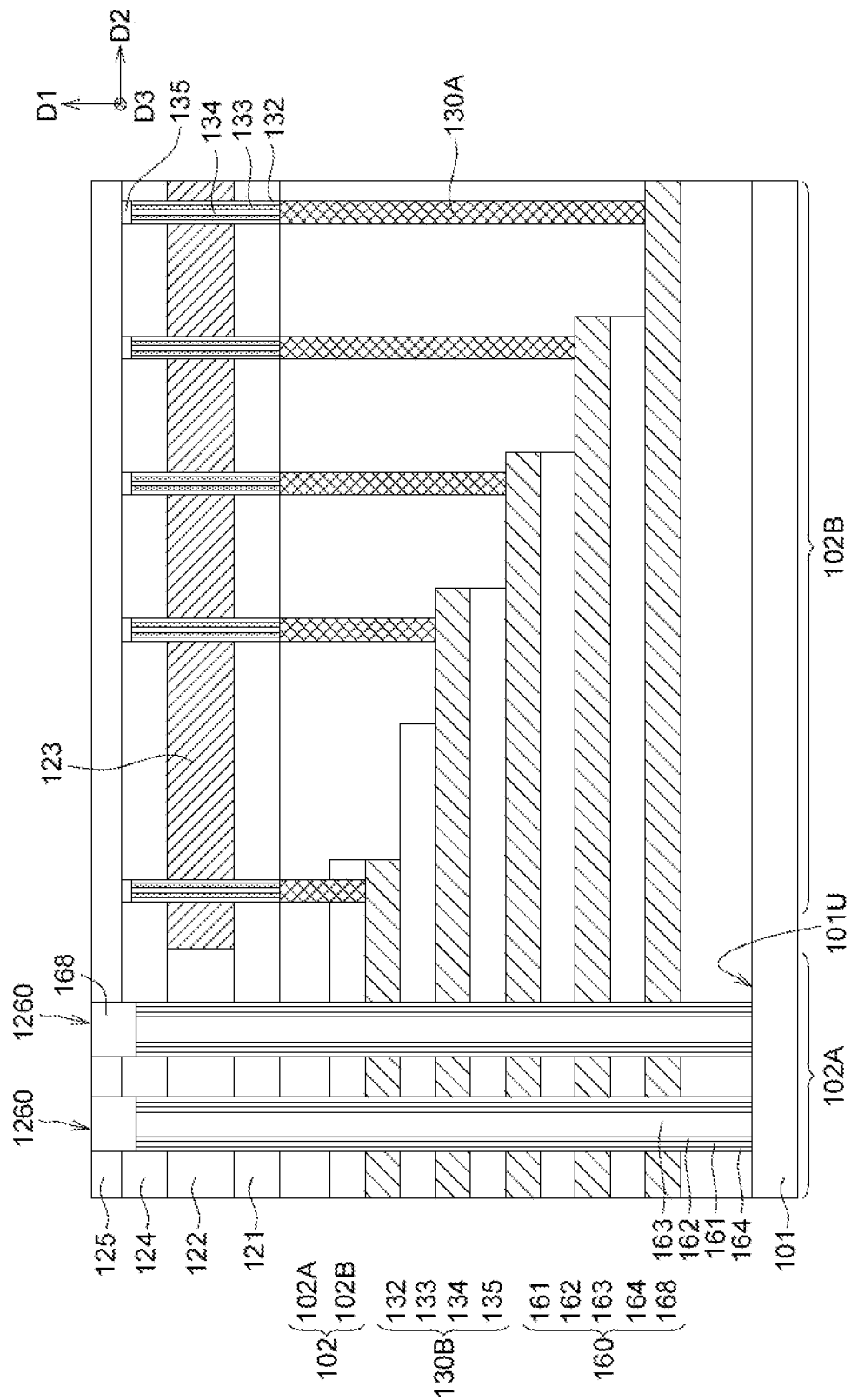

Referring to FIG. 13, FIG. 13 shows one stage of the method for manufacturing the memory device. Pillar structures 160 are formed. In an embodiment, a first electrode layer 164 is formed on the upper surface 101U of the substrate 101, the sidewall of the memory array stack 102A, the sidewall of the insulating material film 108, the sidewall of the insulating film 121, the sidewall of the insulating film 122, the sidewall of the insulating film 124 and the sidewall of the insulating film 125 exposed by the hole 1260 through a deposition process. An ovonic material layer 161 can be formed on the upper surface 101U of the substrate 101 exposed by the hole 1260 and the sidewall of the first electrode 164 through a deposition process. A second electrode layer 162 can be formed on the upper surface 101U of the substrate 101 exposed by the hole 1260 and the sidewall of the ovonic material layer 161 through a deposition process. A conductive pillar 163 can be formed on the upper surface 101U of the substrate 101 exposed by the hole 1260 and the sidewall of the second electrode layer 162 through a deposition process. A portion of the first electrode 164, a portion of the ovonic material layer 161, a portion of the second electrode 162, and a portion of the conductive pillar 163 can be removed through an etching process, and then a landing pad 168 can be formed on the remained portions of the first electrode 164, the ovonic material layer 161, the second electrode 162 and the conductive pillar 163 through a deposition process. Therefore, the pillar structure 160 including the first electrode layer 164, the ovonic material layer 161, the second electrode layer 162, the conductive pillar 163 and the landing pad 168 are formed. The conductive pillar 163 can fill the space surrounded by the second electrode layer 162.

The first electrode layer 164 and the second electrode layer 162 may include conductive materials, such as titanium nitride, tantalum nitride, titanium, cobalt, doped polycrystalline silicon and silicide. The first electrode layer 164 and the second electrode layer 162 may include the same or different materials. In some embodiments, the first electrode layer 164 and the second electrode layer 162 may each independently be a C/TiN multilayer structure or composite material, or tantalum nitride, or a Ti/TaN multilayer structure or composite material, or cobalt, or N+ polycrystalline silicon, or P+ polycrystalline silicon, or silicide. The ovonic material layer 161 may include chalcogenide. In some embodiments, the ovonic material layer 161 may be a Ge/As/Se multilayer structure or composite material, or a Ge/As/Se/Sn multilayer structure or composite material, or a Ge/As/Si/Se/Te/S multilayer structure or composite material, or a Ge/As/SiTe/S/Sn multilayer structure or composite material, or a Si/Te/As/Se/Si multilayer structure or composite material. The conductive pillar 163 may include a conductive material, such as titanium nitride, tantalum nitride, cobalt, tungsten, copper, ruthenium, aluminum, and silicide. In some embodiments, the conductive pillar 163 includes TiN/TaN multilayer structure or composite material. The landing pad 168 may include a conductive material such as titanium nitride, tantalum nitride, tungsten, copper, cobalt, aluminum, doped polycrystalline silicon and silicide. In some embodiments, the landing pad 168 includes or is a TiN/W/Cu multilayer structure or composite material.

In other embodiments, the pillar structure 160 may not include the first electrode layer 164 and/or the second electrode layer 162, and thus the steps of forming the first electrode layer 164 and/or the second electrode layer 162 described above can be omitted.

Figure 14:
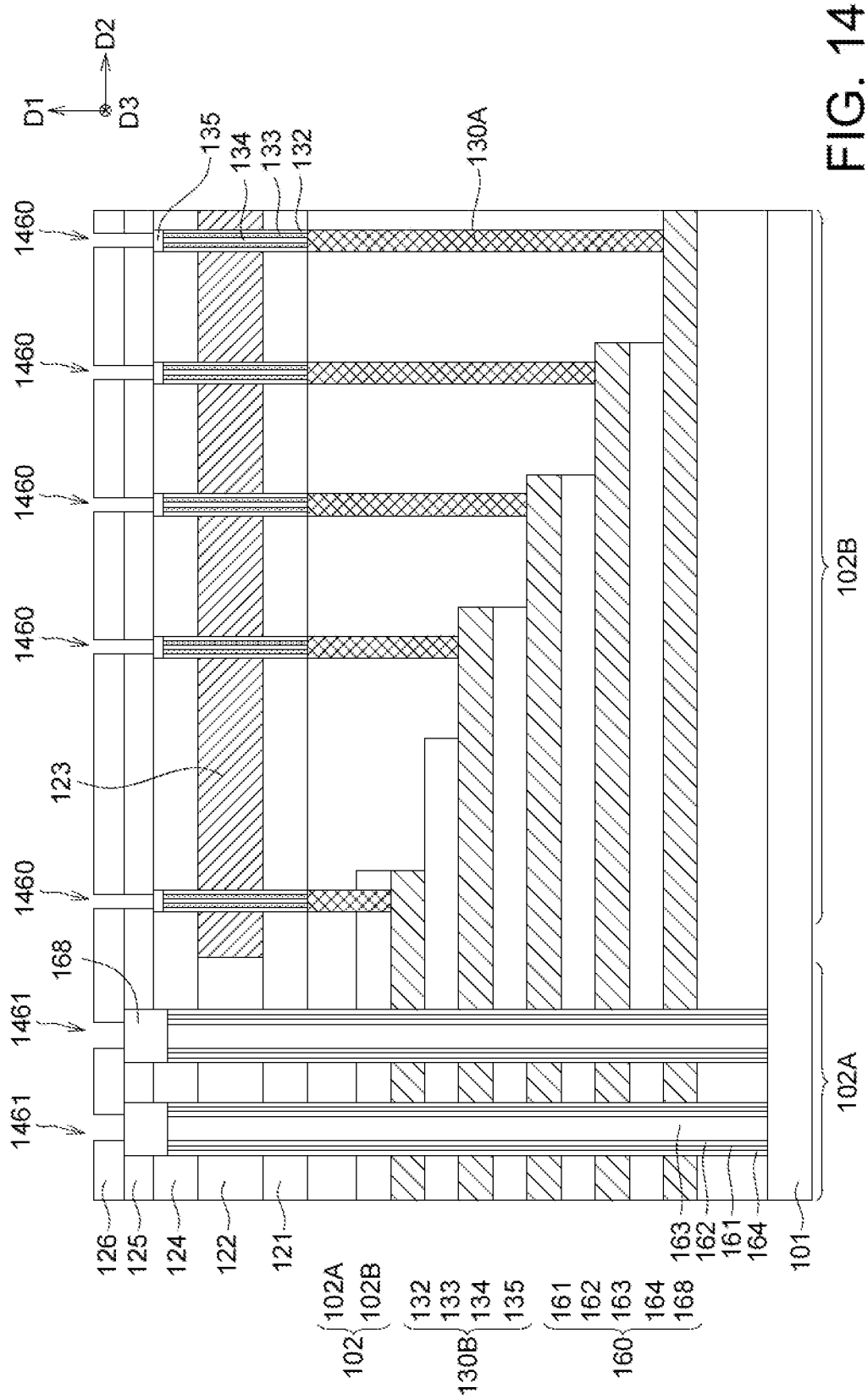

Referring to FIG. 14, FIG. 14 shows one stage of the method for manufacturing the memory device. An insulating film 126, holes 1460 and holes 1461 are formed. The insulating film 126 is on the insulating film 125 and the pillar structures 160. The holes 1460 are arranged separately from each other on the staircase stack 102B of the stack structure 102. The hole 1460 extends along the first direction D1 and passes through the insulating film 125 and the insulating film 126. The upper surfaces of the pads 135 of the second pillar portions 130B, the sidewalls of the insulating film 125 and the sidewalls of insulating film 126 are exposed by the holes 1460. The holes 1461 are arranged separately from each other on the memory array stack 102A of the stack structure 102. The hole 1461 extends along the first direction D1 and passes through the insulating film 126. The upper surfaces of the landing pads 168 of the pillar structures 160 and the sidewalls of the insulating film 126 are exposed by the holes 1461. In an embodiment, an insulating film 126 can be formed on the insulating film 125 and the pillar structures 160 through a deposition process, and then a portion of the insulating film 125 and a portion of the insulating film 126 can be removed through an etching process to form the holes 1460 and 1461. The insulating film 126 may include an insulating material, such as silicon oxide, lithium titanium oxide (LTO), silicon nitride, hafnium oxide ($HfO_x$), zirconium hafnium oxide ($HfZrO_x$) or silicon oxynitride ($SiON_x$).

Figure 15:
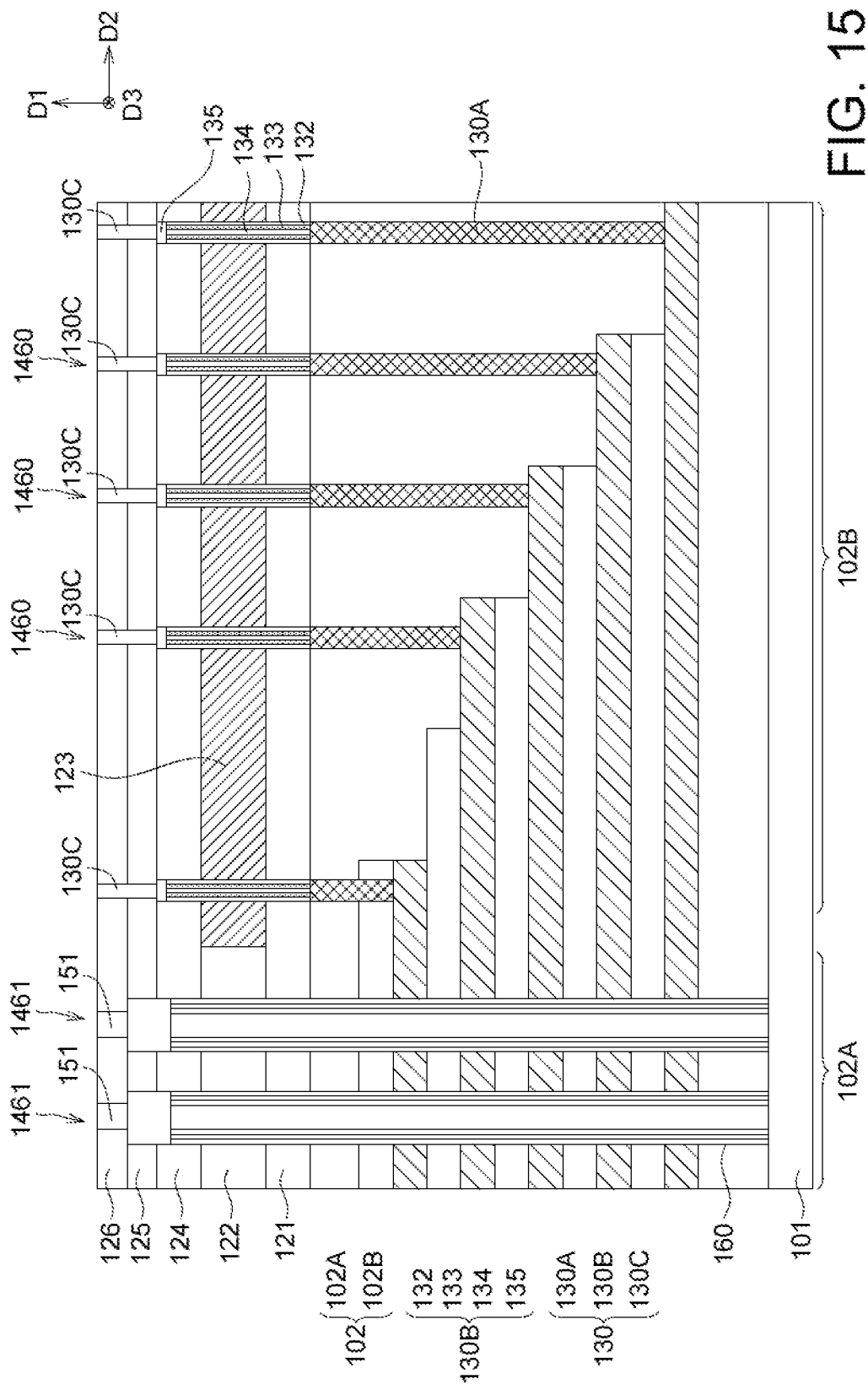

Referring to FIG. 15, FIG. 15 shows one stage of the method for manufacturing the memory device. Contact pillars 151 and third pillar portions 130C are formed. In an embodiment, the third pillar portions 130C are formed in the holes 1460 through a deposition process and the contact pillars 151 are formed in the holes 1461 through a deposition process. The contact pillar 151 and the third pillar portion 130C may include conductive materials, such as doped or undoped polycrystalline silicon or metal.

Figure 16:
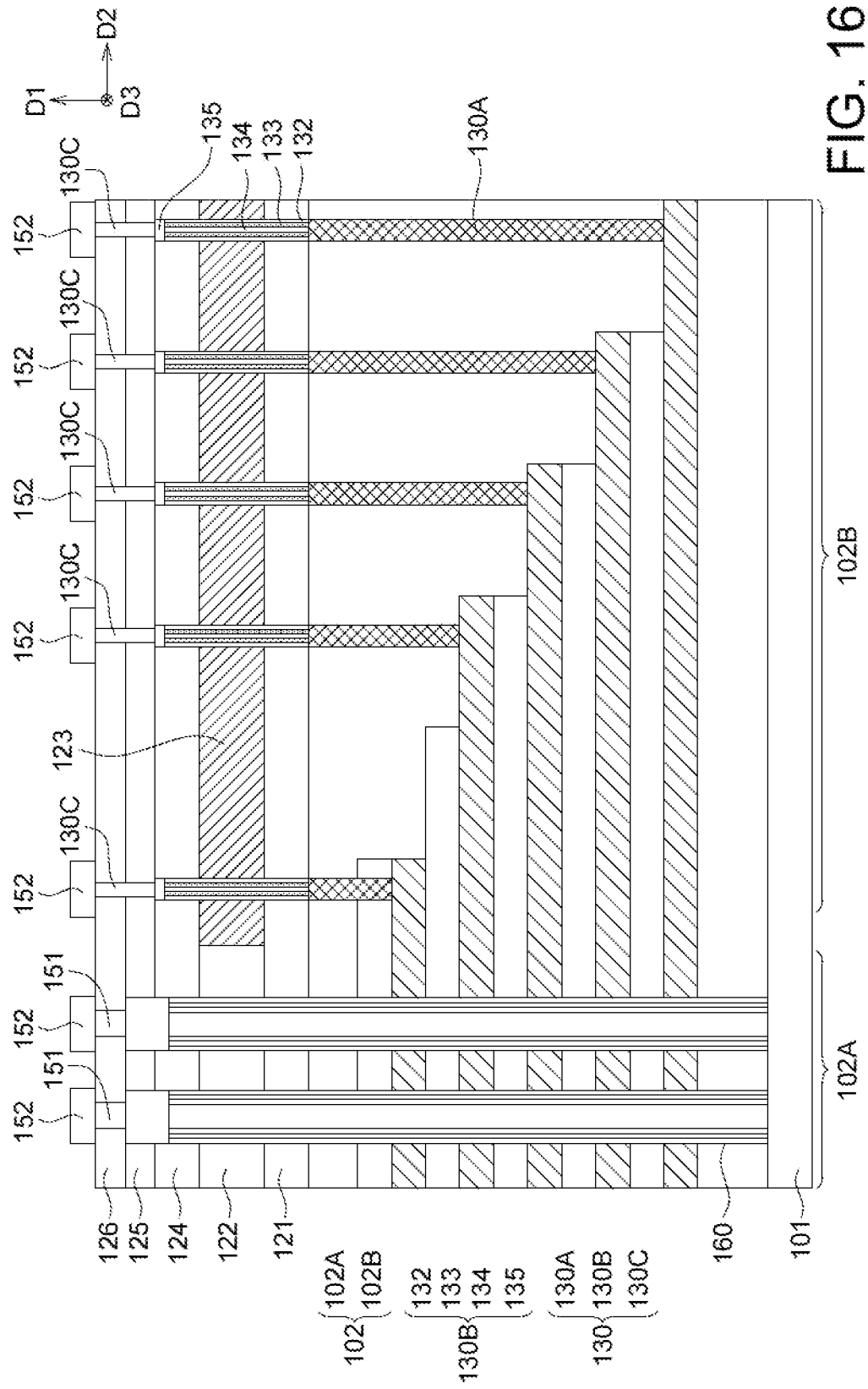

Referring to FIG. 16, FIG. 16 shows one stage of the method for manufacturing the memory device. Wires 152 are formed. The wires can be formed on the upper surfaces of the contact pillars 151 and the upper surfaces of the third pillar portions 130C through a deposition process. The positions of the wires can correspond to the positions of the contact pillars 151 and the third pillar portions 130C. The wires 152 may include conductive materials.

In an embodiment, through the method schematically illustrated in FIGS. 2 to 16, a memory device 10 shown in FIGS. 1A and 1B is provided. In an embodiment, the method shown in FIGS. 2 to 16 use a high thermal process to form the second pillar portion 130B, so that a larger current can pass through the channel element 133 of the second pillar portion 130B.

FIGS. 17 to 31 illustrate a method for manufacturing a memory device according to another embodiment of the present disclosure.

Figure 17:
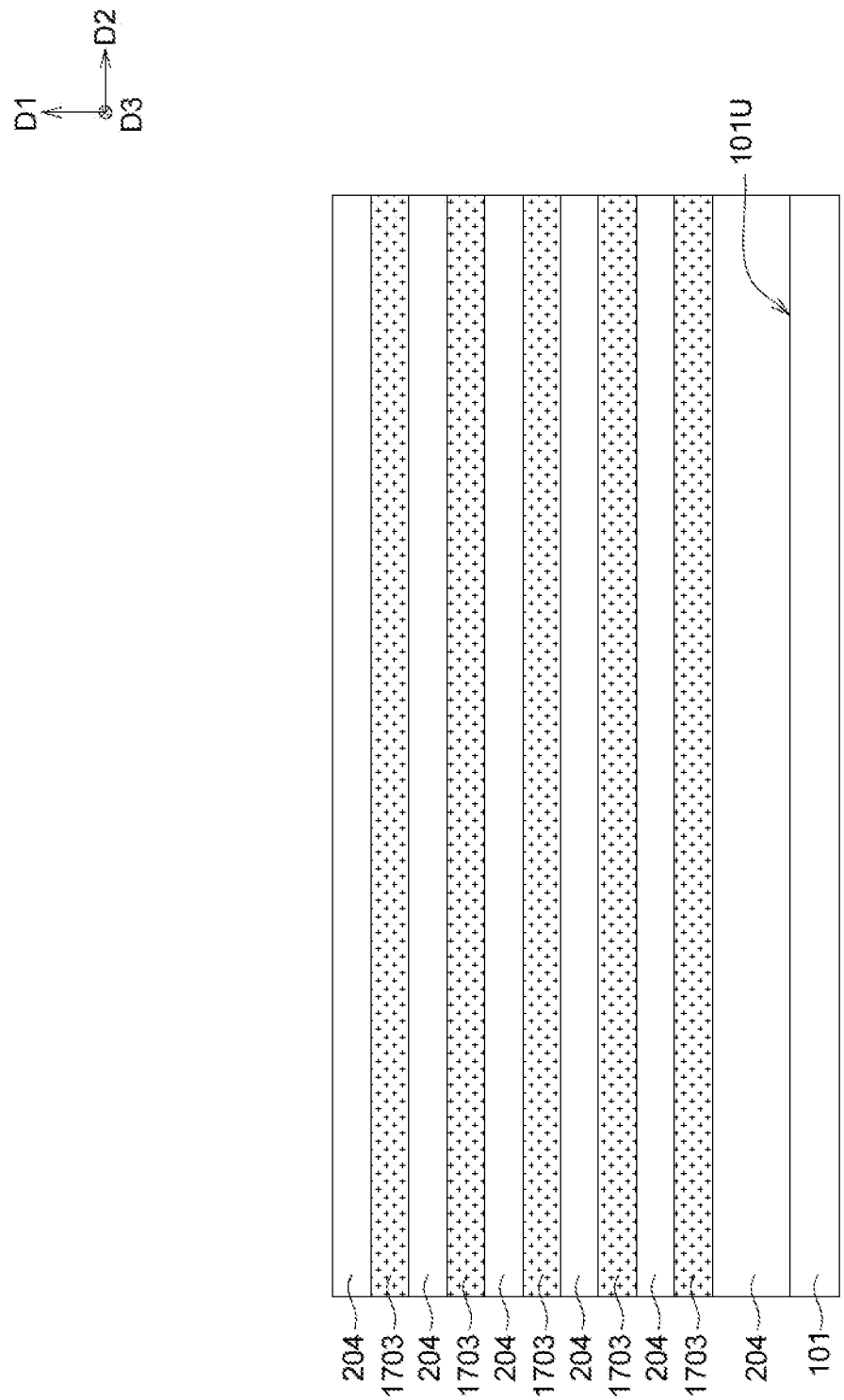
FIGS. 17 to 31 illustrate a method for manufacturing a memory device according to another embodiment of the present disclosure.

Referring to FIG. 17, FIG. 17 shows one stage of the method for manufacturing the memory device. A substrate 101 is provided. Insulating material layers 1703 and insulating material layers 204 stacked alternately along the first direction D1 are formed on the upper surface 101U of the substrate 101. The first direction D1 may be the normal direction of the upper surface 101U of the substrate 101. In an embodiment, the insulating material layers 1703 and the insulating material layers 204 are formed on the upper surface 101U of the substrate 101 through a deposition process. The thickness of the lowest insulating material layer 204 among the insulating material layers 204 in the first direction D1 may be greater than the thickness of the other insulating material layer 204 in the first direction D1. The topmost insulating material layer 204 among the insulating material layers 204 may be a hard mask layer. The insulating material layer 1703 may include nitride such as silicon nitride.

Figure 18:
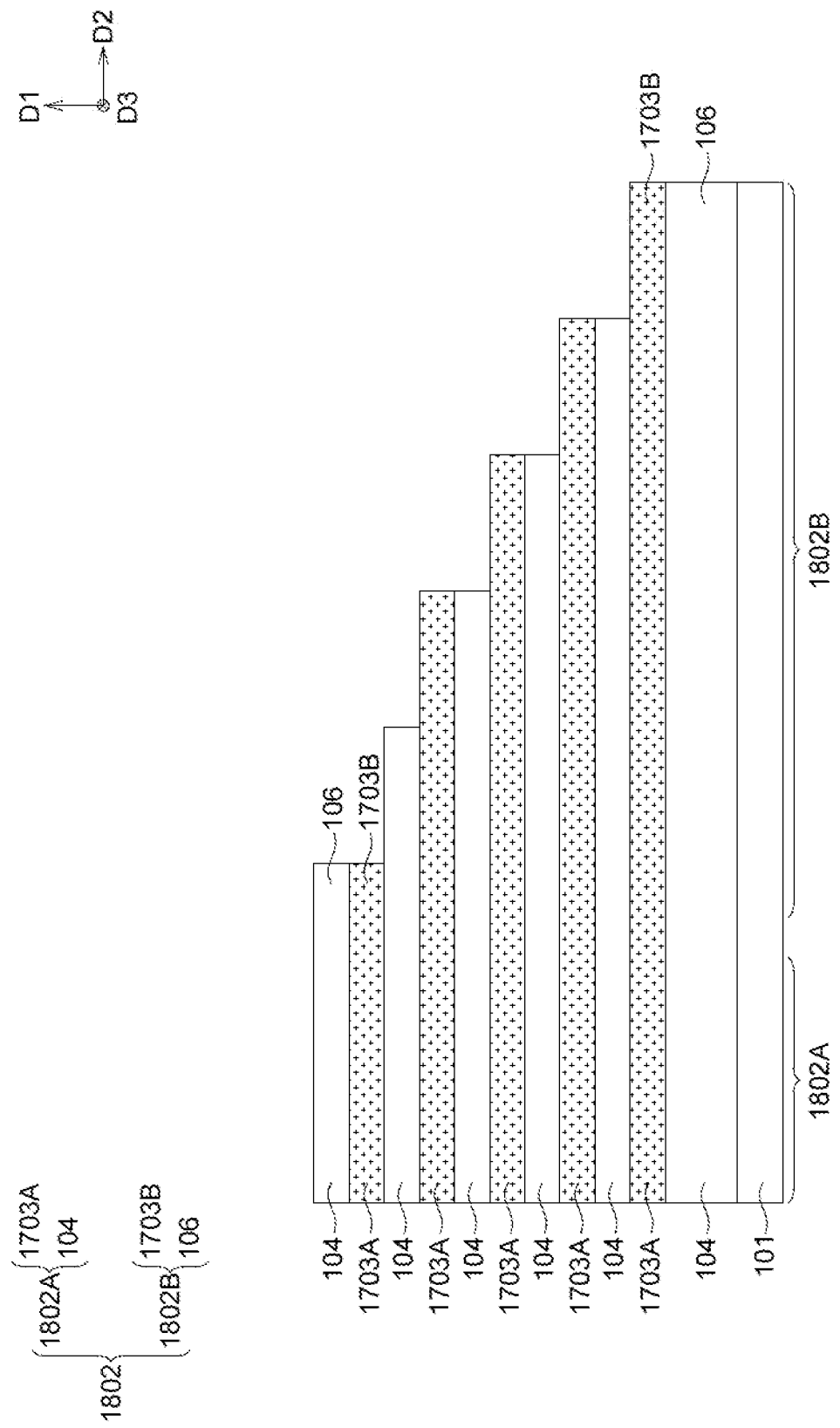

Referring to FIG. 18, FIG. 18 shows one stage of the method for manufacturing the memory device. An insulating stack structure 1802 is formed on the substrate 101. In an embodiment the insulating material layers 1703 and the insulating material layers 204 shown in FIG. 17 are patterned through an etching process so as to form the insulating stack structure 1802 including an insulating stack 1802A and a staircase insulating stack 1802B. A portion of the insulating material layer 1703 defined in the insulating stack 1802A is an insulating layer 1703A. A portion of the insulating material layer 1703 defined in the staircase insulating stack 1802B is an insulating stair layer 1703B. A portion of the insulating material layer 204 defined in the insulating stack 1802A is an insulating layer 104. A portion of the insulating material layer 204 defined in the staircase insulating stack 1802B is an insulating stair layer 106. The insulating stack 1802A includes the insulating layers 1703A and the insulating layers 104 stacked alternately. The staircase insulating stack 1802B includes the insulating stair layers 1703B and the insulating stair layers 106 stacked alternately.

Figure 19:
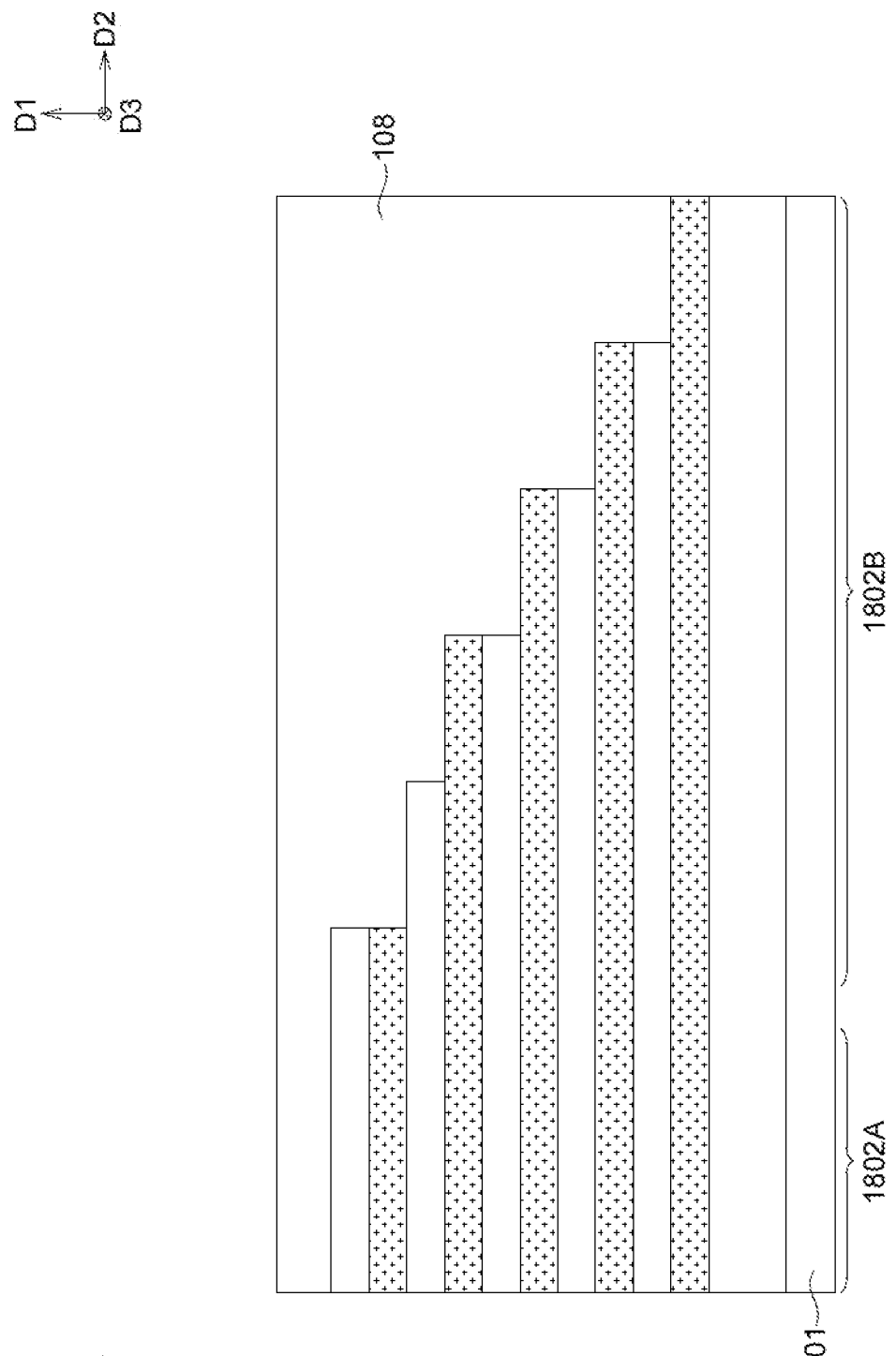

Referring to FIG. 19, FIG. 19 shows one stage of the method for manufacturing the memory device. An insulating material film 108 is formed on the insulating stack 1802A and the staircase insulating stack 1802B. In an embodiment, the insulating material film 108 is formed on the insulating stack 1802A and the staircase insulating stack 1802B through a deposition process.

Figure 20:
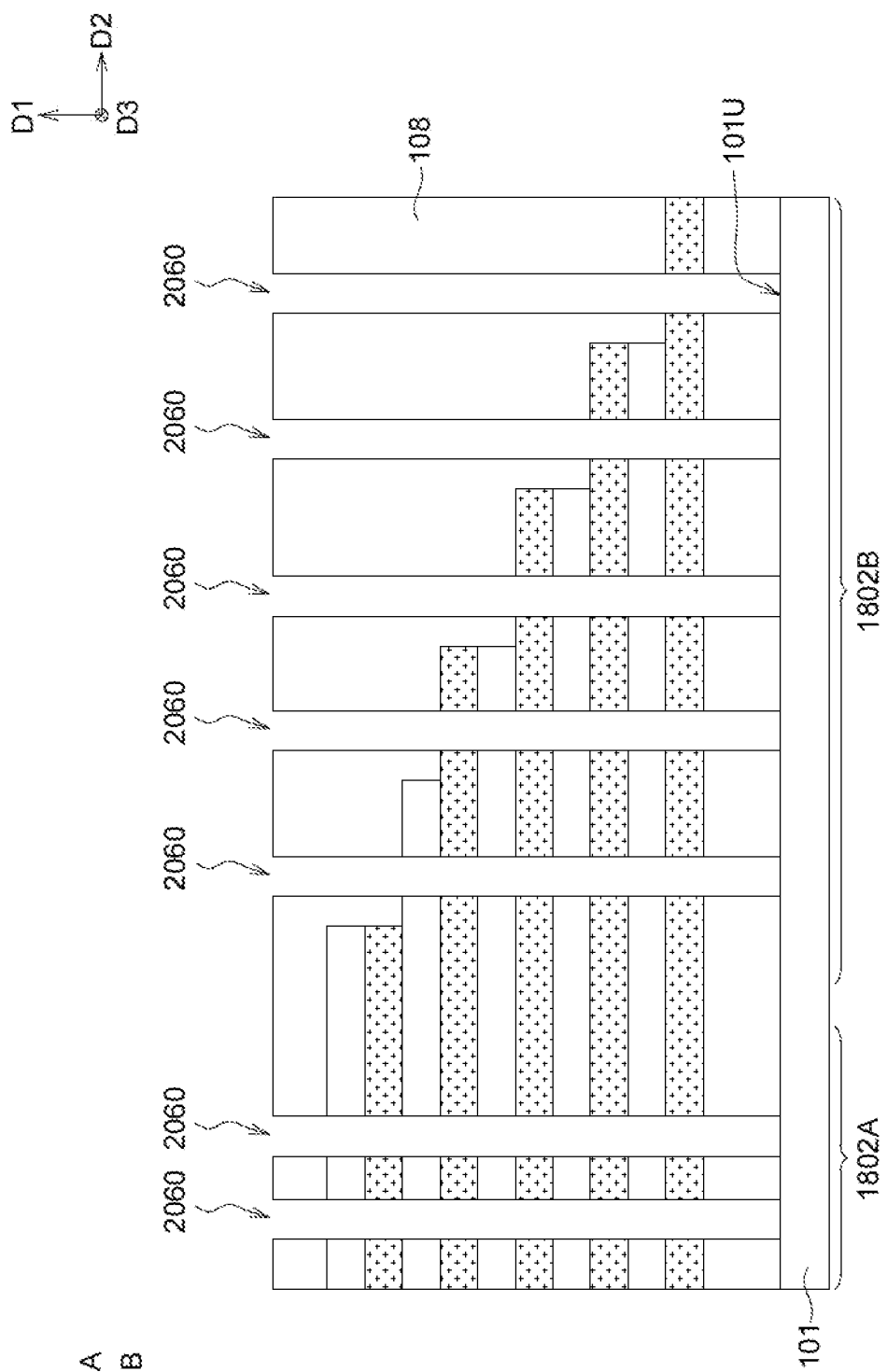

Referring to FIG. 20, FIG. 20 shows one stage of the method for manufacturing the memory device. Holes 2060 are formed. The holes 2060 are arranged separately from each other in the insulating stack 1802A and the staircase insulating stack 1802B. The holes 2060 extend along the first direction D1 and pass through the insulating material film 108, the insulating stack 1802A and the staircase insulating stack 1802B. A portion of the upper surface 101U of the substrate 101, sidewalls of the insulating stack 1802A, sidewalls of the staircase insulating stack 1802B, and sidewalls of the insulating material film 108 are exposed by the holes 2060. In an embodiment, a portion of the insulating stack 1802A, a portion of the staircase insulating stack 1802B and a portion of the insulating material film 108 are removed by an etching process to form the holes 2060.

Figure 21:
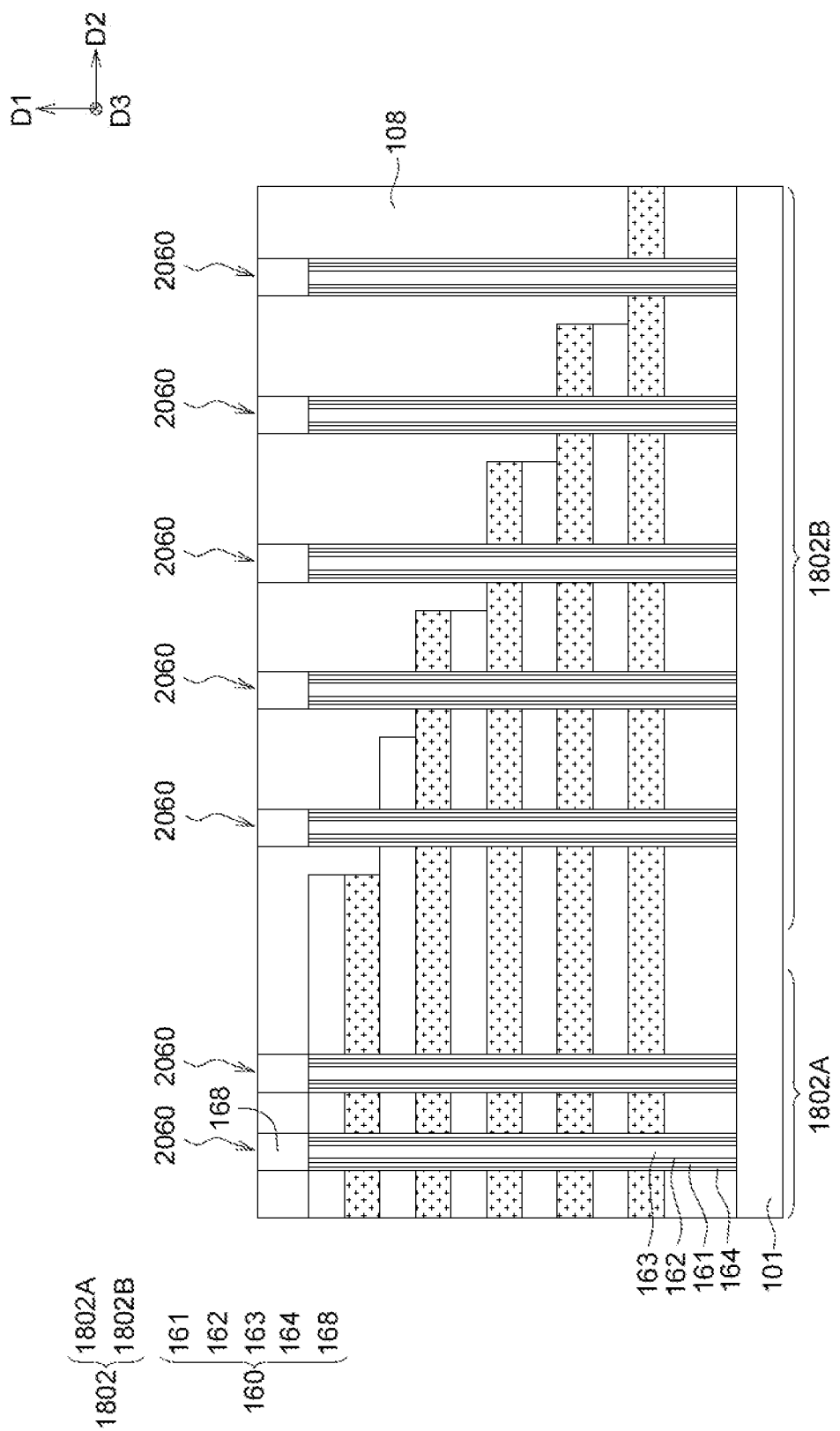

Referring to FIG. 21, FIG. 21 shows one stage of the method for manufacturing the memory device. Pillar structures 160 are formed. In an embodiment, a first electrode layer 164, an ovonic material layer 161, a second electrode layer 162, a conductive pillar 163 and a landing pad 168 can be sequentially formed in the hole 2060 through deposition processes and etching processes so as to form the pillar structure 160. In other embodiments, the pillar structure 160 may not include the first electrode layer 164 and/or the second electrode layer 162, and thus the steps of forming the first electrode layer 164 and/or the second electrode layer 162 described above can be omitted.

Figure 22:
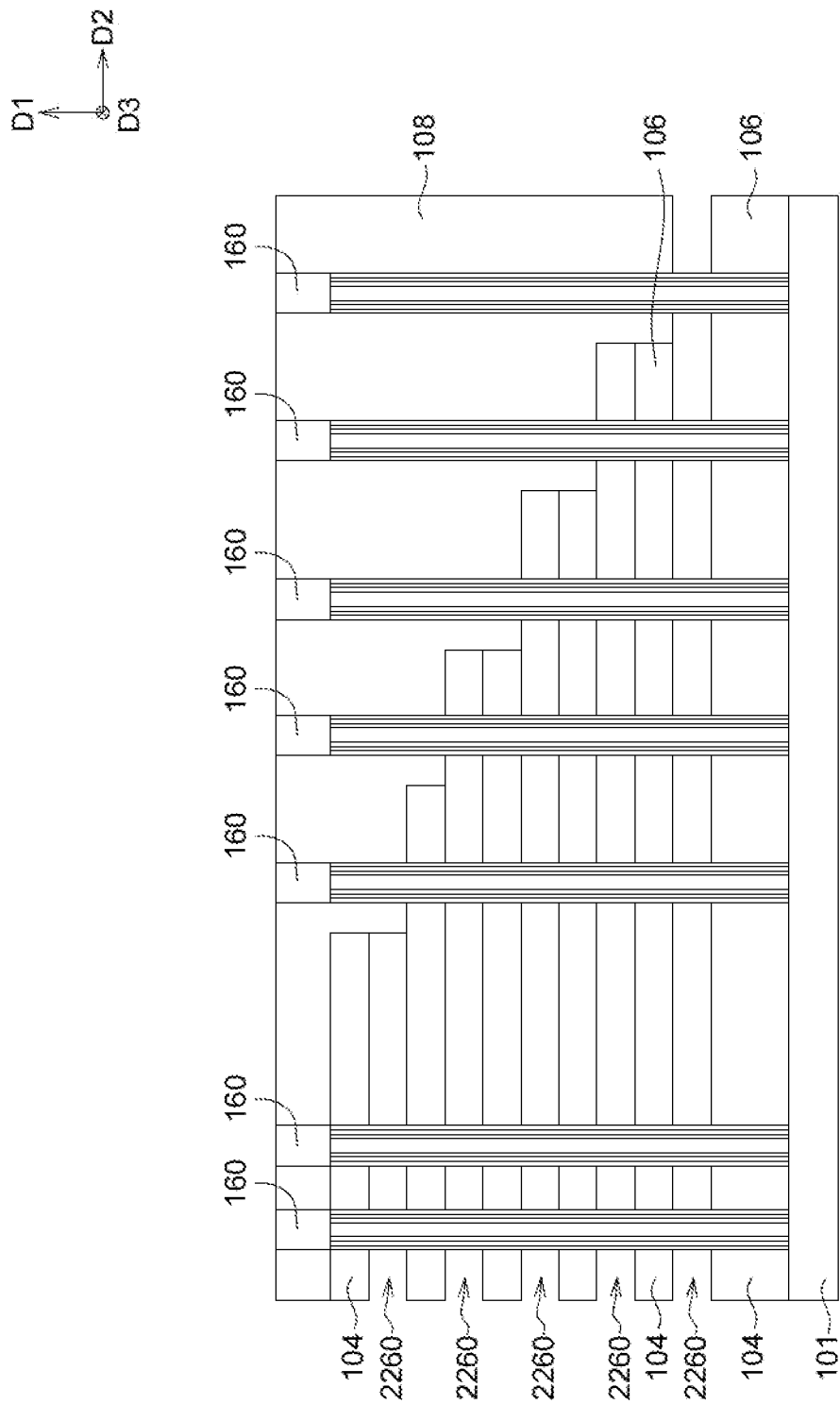

Referring to FIG. 22, FIG. 22 shows one stage of the method for manufacturing the memory device. The insulating layers 1703A and the insulating stair layers 1703B are removed to form recesses 2260. The pillar structures 160 can be used as support elements of the structure to avoid collapse. In an embodiment, the insulating layers 1703A between the insulating layers 104 and the insulating stair layers 1703B between the insulating stair layer 106 are removed through an etching process to form the recesses 2260 and remain the insulating layers 104 and the insulating stair layer 106.

Figure 23:
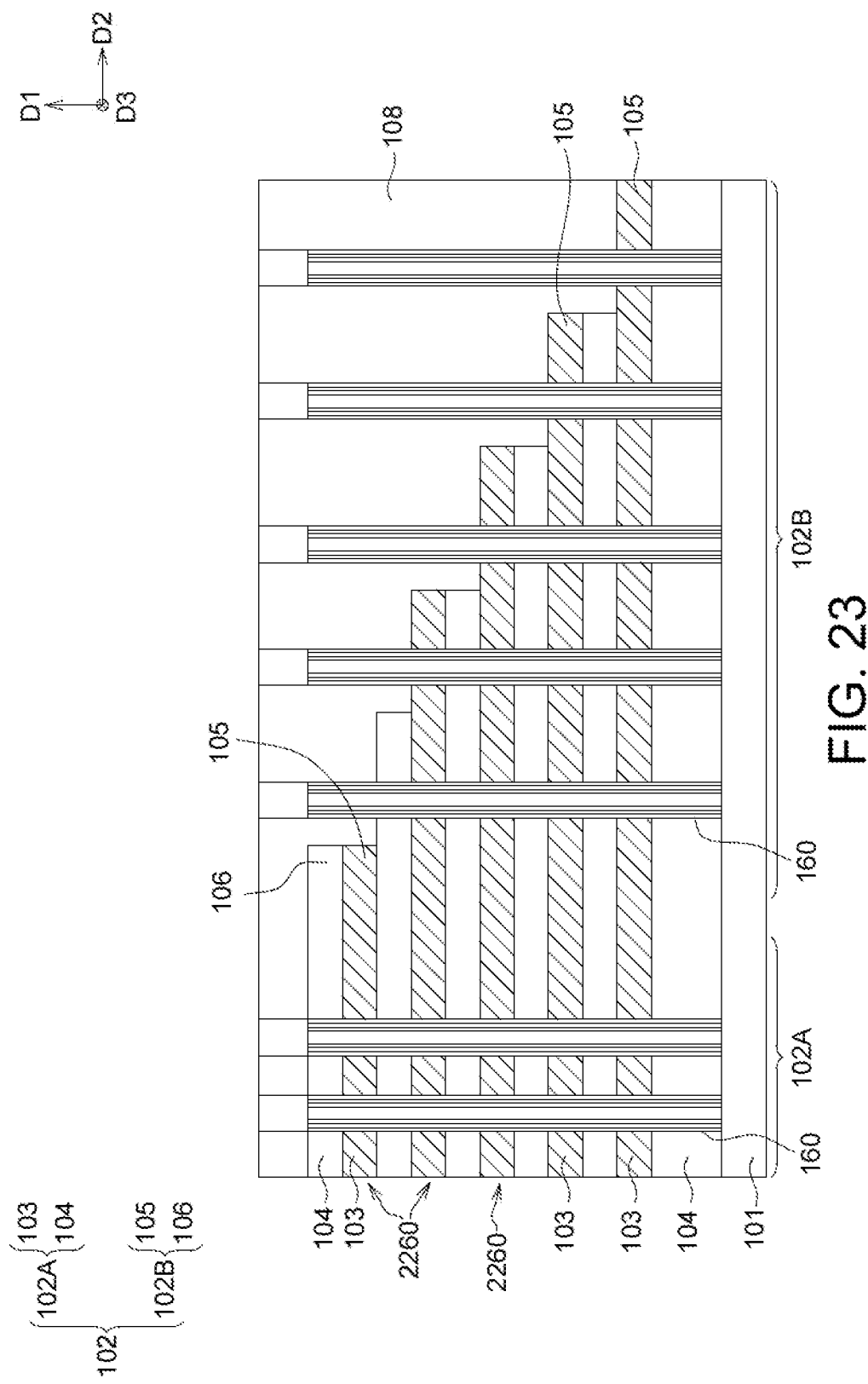

Referring to FIG. 23, FIG. 23 shows one stage of the method for manufacturing the memory device. Conductive layers 103 and conductive stair layers 105 are formed. In an embodiment, the conductive layers 103 and the conductive stair layers 105 are formed in the recesses 2260 through a deposition process, and thus a stack structure 102 including a memory array stack 102A and a staircase stack 102B is formed.

Figure 24:
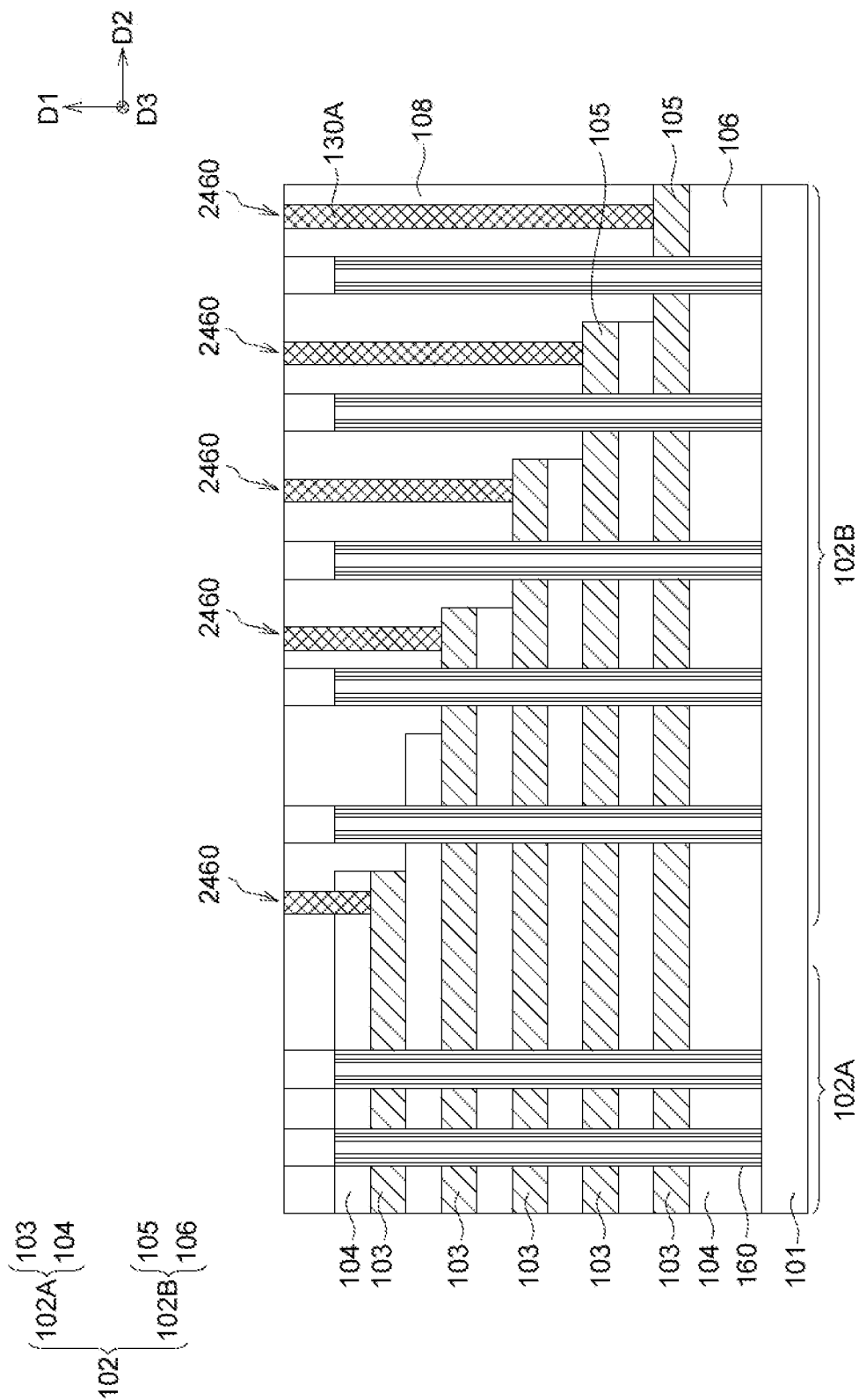

Referring to FIG. 24, FIG. 24 shows one stage of the method for manufacturing the memory device. First pillar portions 130A are formed. In an embodiment, a portion of the staircase stack 102B and a portion of the insulating material film 108 are removed through an etching process to form holes 2460, and then conductive materials are filled in the holes 2460 to form the first pillar portions 130A. The holes 2460 are arranged separately from each other in the insulating material film 108. The sidewalls of the insulating material film 108 and the upper surfaces of the conductive stair layers 105 are exposed by the holes 2460. In an embodiment, a barrier film can be formed on the sidewall of the insulating material film 108 exposed by the hole 2460 through a deposition process before the conductive material is filled in the hole 2460. The barrier layer may include titanium nitride. In an embodiment, a planarization process, such as a chemical-mechanical planarization process, can be performed to the conductive material after the conductive material is filled in the holes 2460. In the present embodiment, the upper surface of the pillar structure 160 and the upper surface of the first pillar portion 130A can be coplanar.

Figure 25:
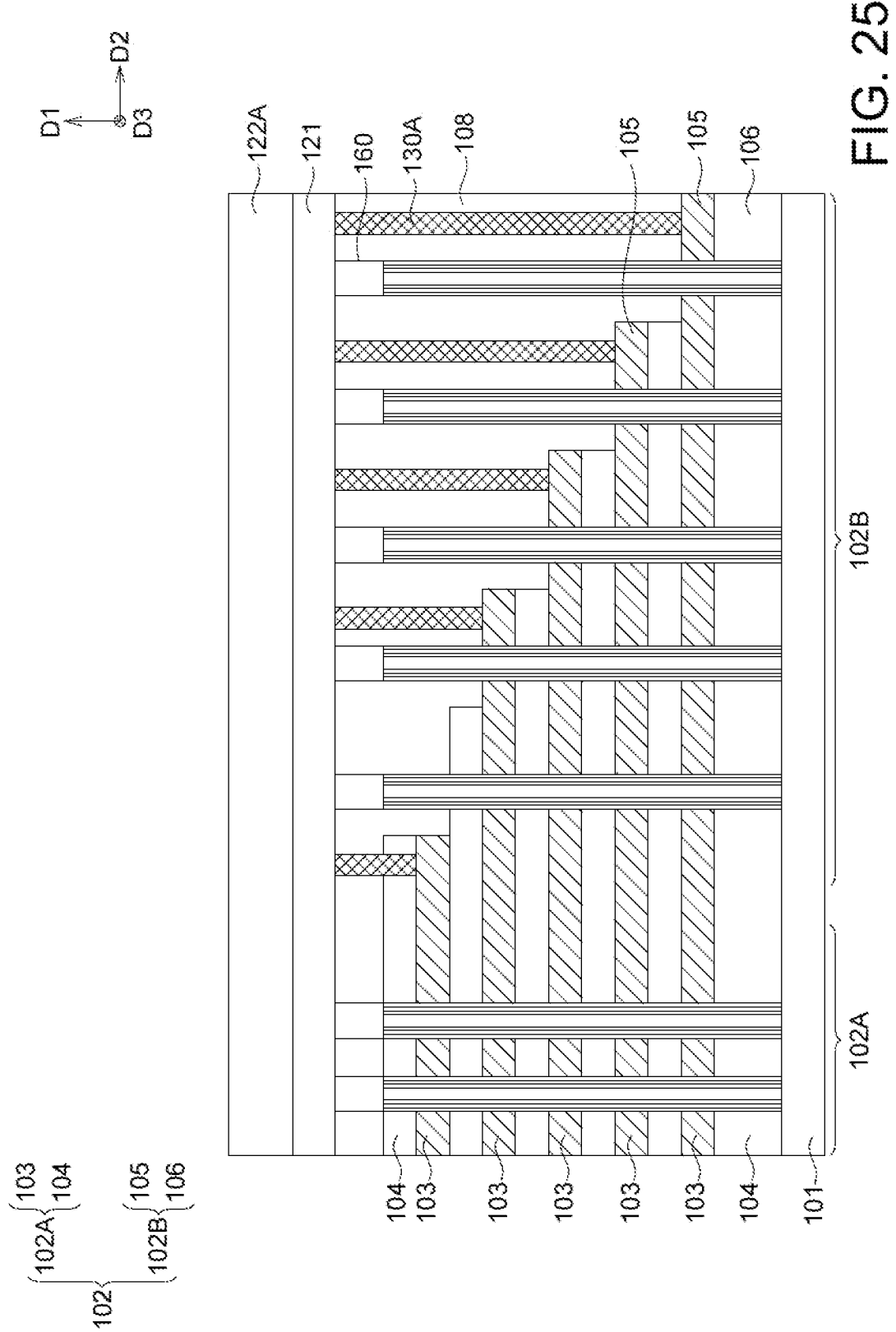

Referring to FIG. 25, FIG. 25 shows one stage of the method for manufacturing the memory device. A insulating film 121 and an insulating film 122A are formed. In an embodiment, the insulating film 121 and the insulating film 122A can be sequentially formed on the insulating material film 108, the first pillar portions 130A and the pillar structures 160.

Figure 26:
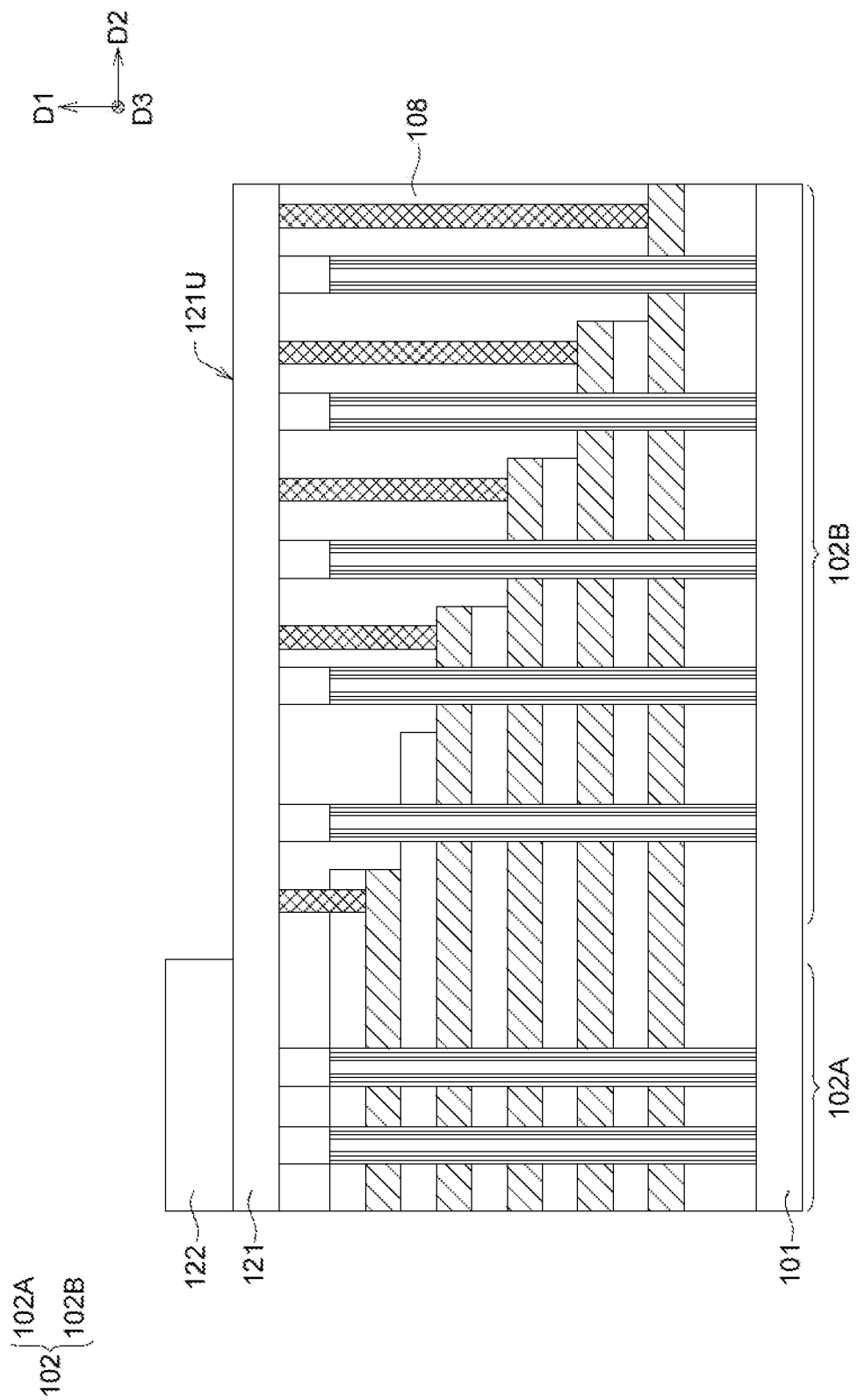

Referring to FIG. 26, FIG. 26 shows one stage of the method for manufacturing the memory device. An insulating film 122 is formed. In an embodiment, a portion of the insulating film 122A is removed through an etching process to expose a portion of the upper surface 121U of the insulating film 121, and the remained portion of the insulating film 122A is the insulating film 122.

Figure 27:
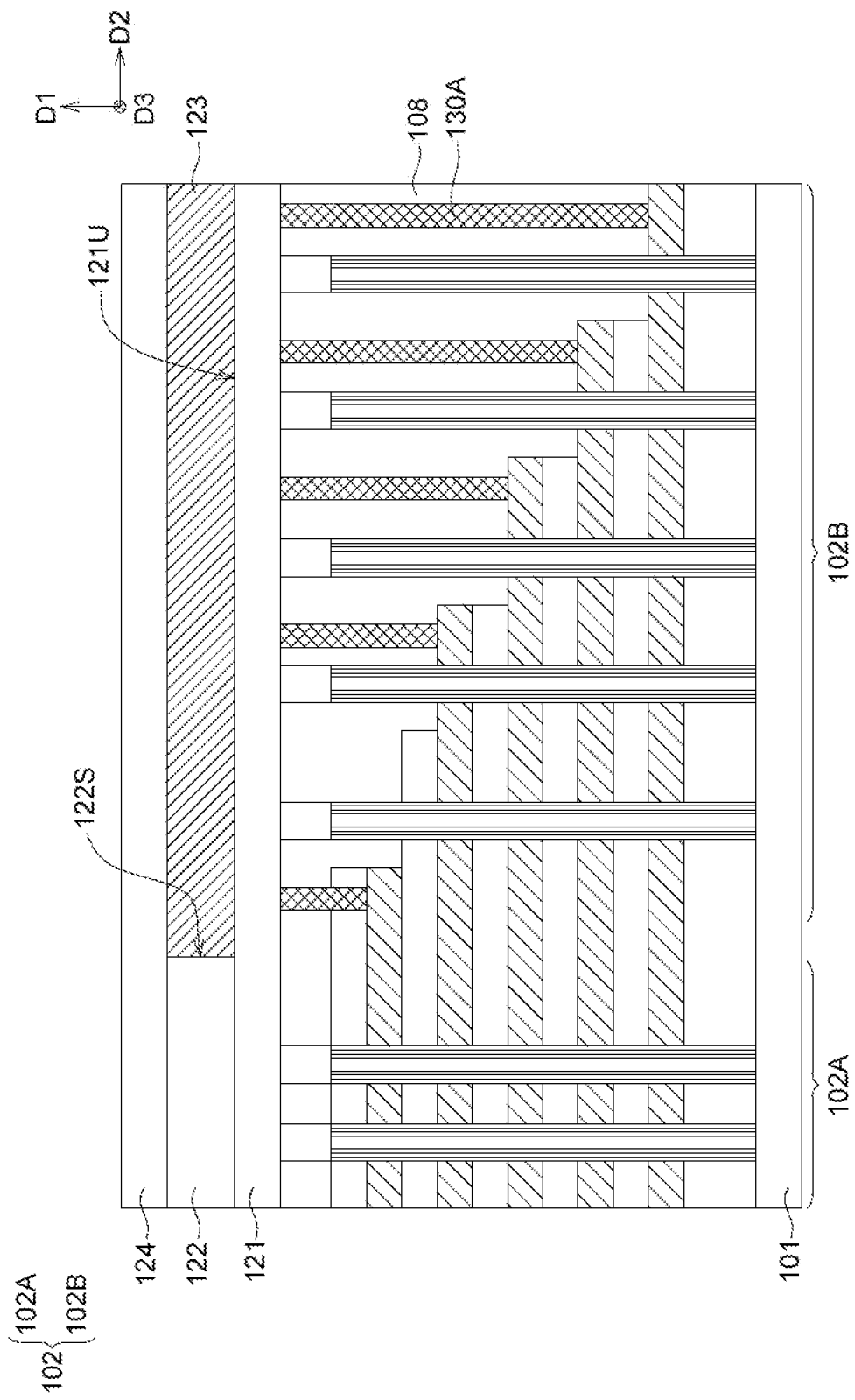

Referring to FIG. 27, FIG. 27 shows one stage of the method for manufacturing the memory device. A conductive film 123 and an insulating film 124 are formed. In an embodiment, the conductive film 123 is formed on the upper surface 121U of the insulating film 121 and the sidewall 122S of the insulating film 122 through a deposition process, and then the insulating film 124 is formed on the insulating film 122 and the conductive film 123 through a deposition process.

Figure 28:
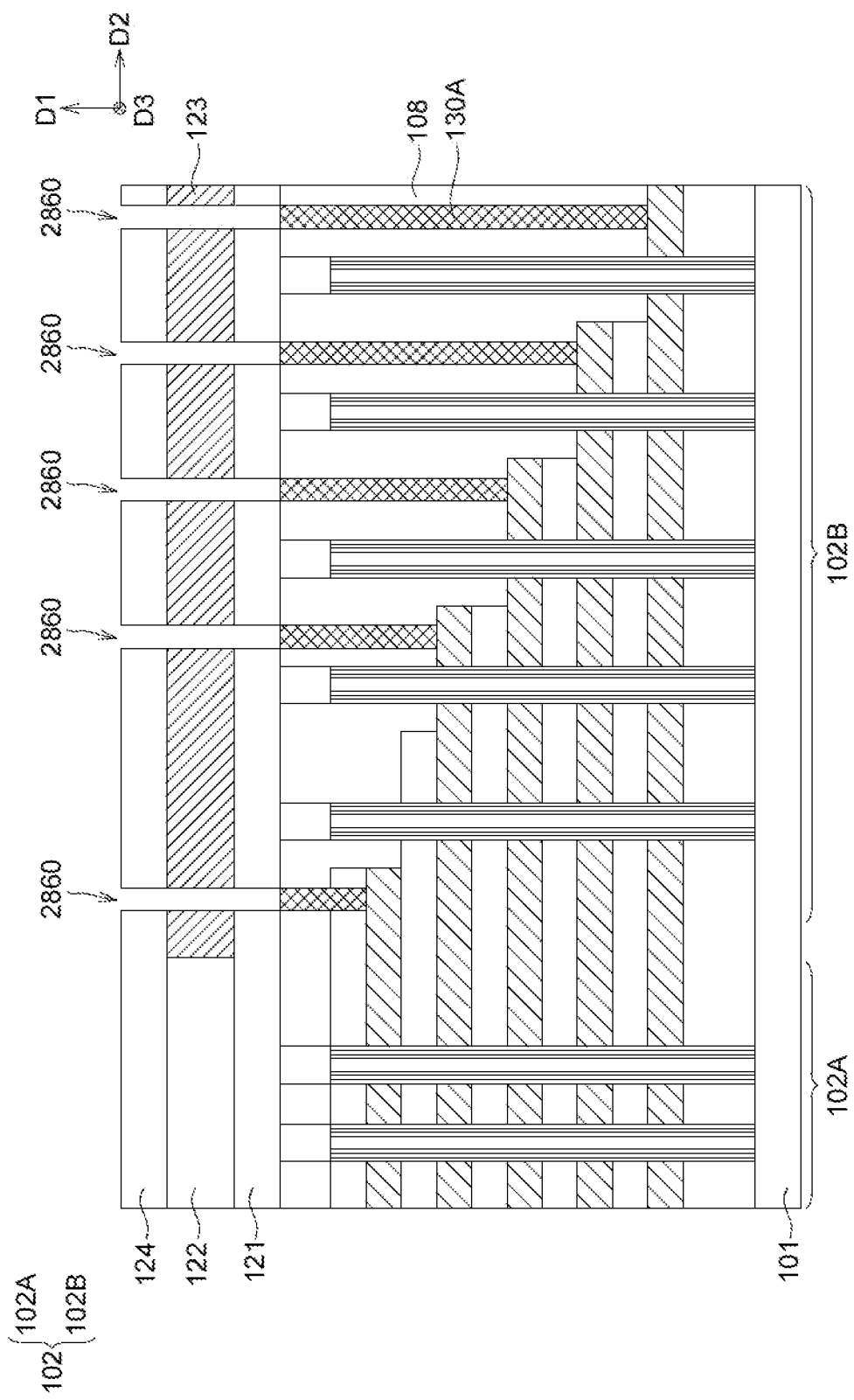

Referring to FIG. 28, FIG. 28 shows one stage of the method for manufacturing the memory device. Holes 2860 are formed. The holes 2860 are arranged separately from each other in the conductive film 123. The hole 2860 extends along the first direction D1 and passes through the insulating film 124, the conductive film 123 and the insulating film 121. The upper surfaces of the first pillar portions 130A, the sidewalls of the insulating film 121, the sidewalls of the conductive film 123 and the sidewalls of the insulating film 124 are exposed by the holes 2860. The positions of the holes 2860 can correspond to the positions of the first pillar portions 130A. In an embodiment, a portion of the insulating film 124, a portion of the conductive film 123 and a portion of the insulating film 121 are removed through an etching process to form the holes 2860.

Figure 29:
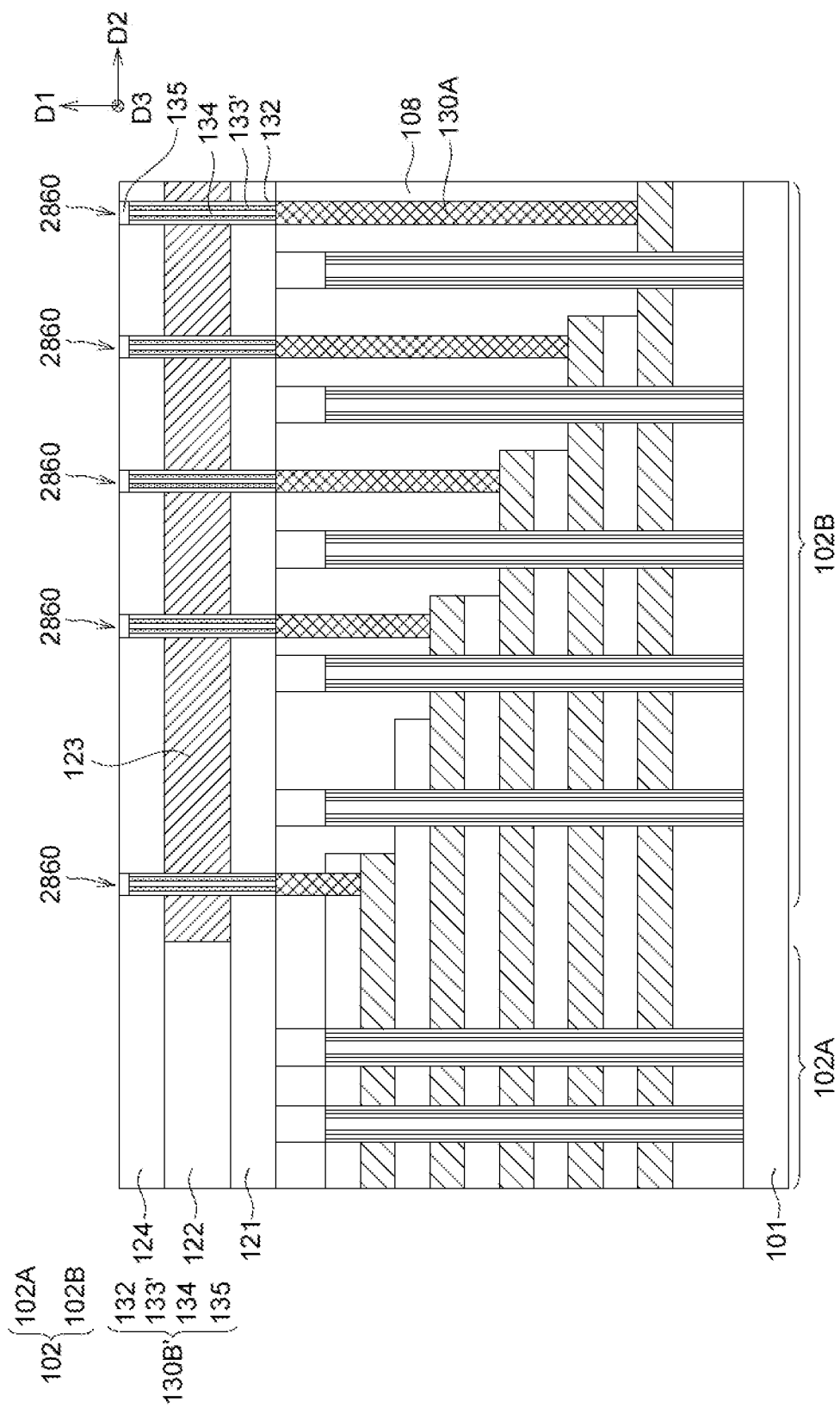

Referring to FIG. 29, FIG. 29 shows one stage of the method for manufacturing the memory device. Second pillar portions 130B' are formed. In an embodiment, a gate dielectric can be filled in the holes 2860 through a deposition process, and a portion of the gate dielectric can be removed through a anisotropic etching process to form a dielectric element 132; a channel element 133' can then be formed on the sidewall of the dielectric element 132 through a deposition process; a dielectric pillar 134 can then be formed on the sidewall of the channel element 133' through a deposition process; a pad 135 can then be formed on the upper surface of the dielectric element 132, the upper surface of the channel element 133' and the upper surface of the dielectric pillar 134 through a deposition process. Therefore, the second pillar portion 130B' including the dielectric element 132, the channel element 133', the dielectric pillar 134 and the pad 135 are formed. The dielectric pillar 134 may fills the space surrounded by the channel element 133'. The channel element 133' may include indium gallium zinc oxide (IGZO).

Figure 30:
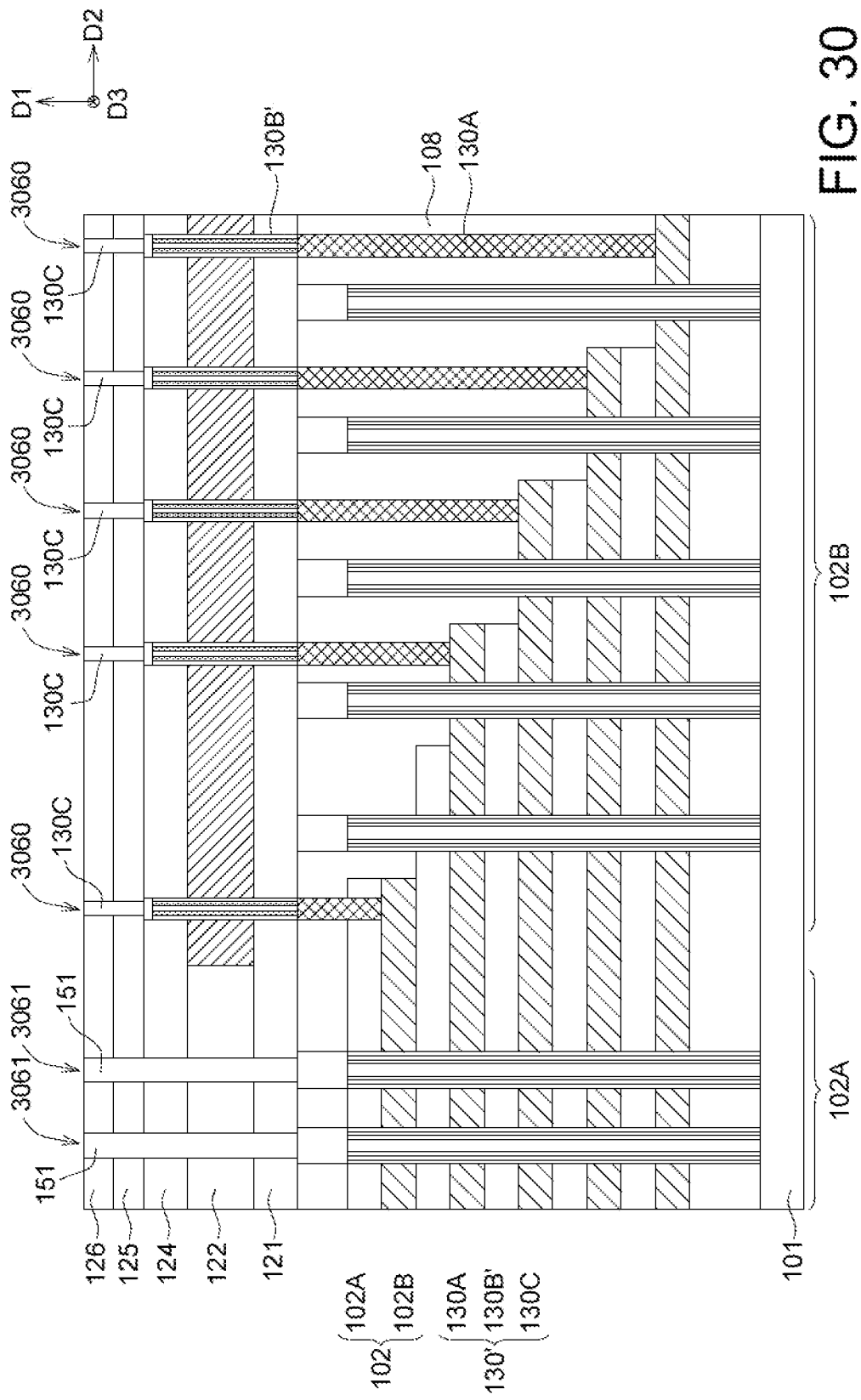

Referring to FIG. 30, FIG. 30 shows one stage of the method for manufacturing the memory device. An insulating film 125, an insulating film 126, contact pillars 151 and third pillar portion 130C are formed. In an embodiment, the insulating film 125 and the insulating film 126 can be sequentially formed on the insulating film 124 and the second pillar portions 130B' through a deposition process; then, a portion of the insulating film 125 and a portion of the insulating film 126 can be removed through an etching process to form holes 3060, and a portion of the insulating film 121, a portion of the insulating film 122, a portion of the insulating film 124, a portion of the insulating film 125 and a portion of the insulating film 126 can be removed through an etching process to form holes 3061. The holes 3060 are arranged separately from each other in the insulating film 125 and the insulating film 126, and on the staircase stack 102B of the stack structure 102. The hole 3060 extends along the first direction D1 and passes through the insulating film 125 and the insulating film 126. The upper surfaces of the second pillar portions 130B', the sidewalls of the insulating film 125 and the sidewalls of insulating film 126 are exposed by the holes 3060. The positions of the holes 3060 can correspond to the positions of the second pillar portions 130B'. The holes 3061 are arranged separately from each other in the insulating film 121, the insulating film 122, the insulating film 124, the insulating film 125 and the insulating film 126, and on the memory array stack 102A of the stack structure 102. The hole 3061 extends along the first direction D1 and passes through the insulating film 121, the insulating film 122, the insulating film 124, the insulating film 125 and the insulating film 126. The upper surfaces of the pillar structures 160, the sidewalls of the insulating film 121, the sidewalls of the insulating film 122, the sidewalls of the insulating film 124, the sidewalls of the insulating film 125 and the sidewalls of the insulating film 126 are exposed by the holes 3061. The positions of the holes 3061 can correspond to the positions of the pillar structures 160 in the memory array stack 102A. In an embodiment, the third pillar portions 130C can be formed in the holes 3060 through a deposition process, and the contact pillars 151 can be formed in the holes 3061 through a deposition process. Therefore, a pillar elements 130' including a first pillar portion 130A, a second pillar portion 130B' and a third pillar portion 130C is formed.

Figure 31:
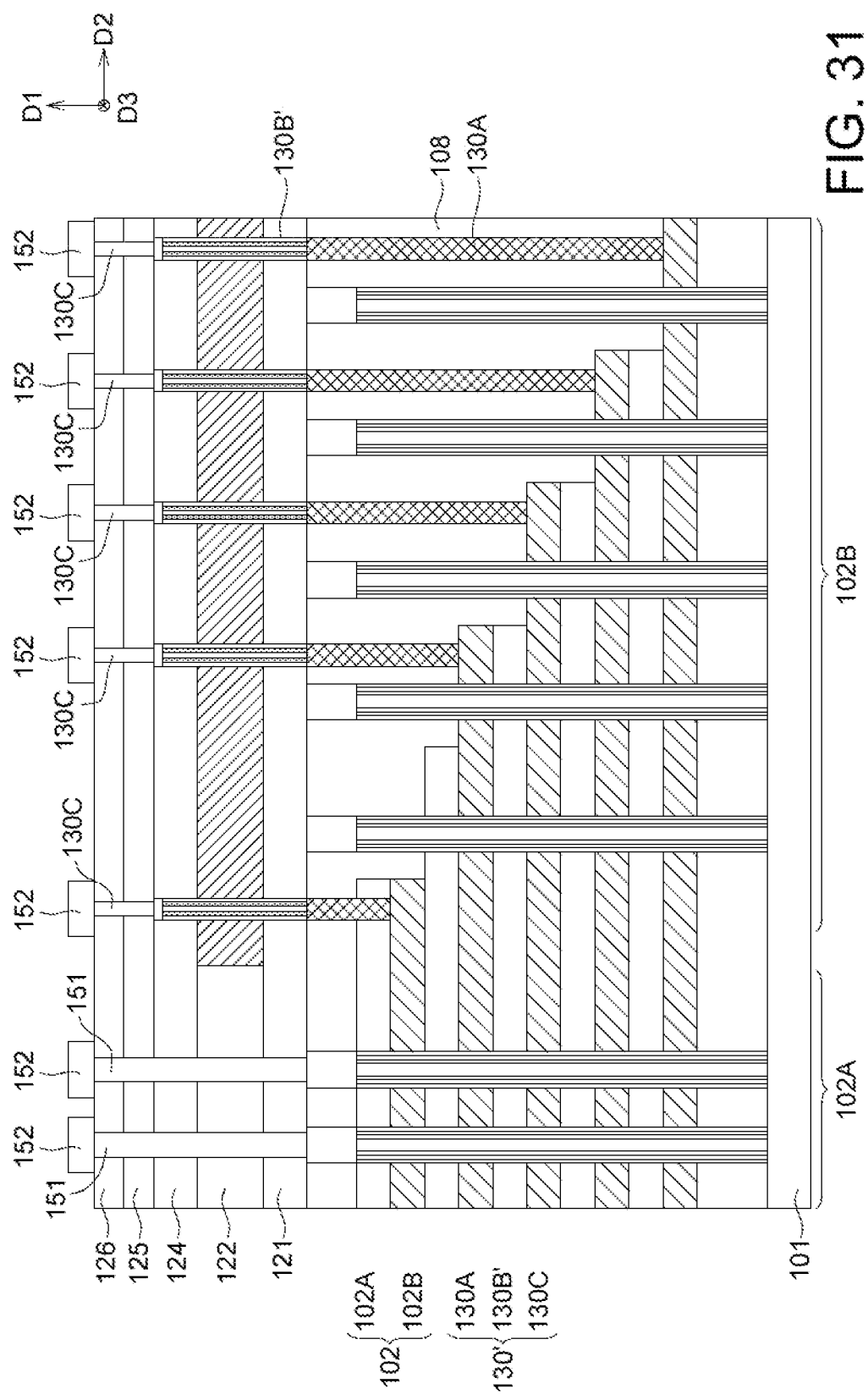

Referring to FIG. 31, FIG. 31 shows one stage of the method for manufacturing the memory device. Wires 152 are formed. The wires can be formed on the upper surfaces of the contact pillars 151 and the upper surfaces of the third pillar portions 130C through a deposition process. The positions of the wires can correspond to the positions of the contact pillars 151 and the third pillar portions 130C.

In an embodiment, through the method schematically illustrated in FIGS. 17 to 31, a memory device 20 shown in FIGS. 1D and 1E is provided. In an embodiment, the method shown in FIGS. 17 to 31 use a low thermal process to form the second pillar portion 130B' (i.e. the temperature of the manufacturing process for the second pillar portion 130B' in the method shown in FIGS. 17 to 31 is smaller than the temperature of the manufacturing process for the second pillar portion 130B in the method shown in FIGS. 2 to 16) to avoid damage to the ovonic material layer 161 in the pillar structure 160 caused by high temperature and avoid the degradation of the electrical performance of the memory device 20 caused by damage to the ovonic material layer 161.

In an embodiment, the method for manufacturing the memory device 10' shown in FIG. 1C can be similar to the method schematically illustrated in FIG. 2 to 16 or the method schematically illustrated in FIGS. 17 to 31.

The memory device of the present disclosure includes a conductive film on a staircase stack, the conductive film does not extend to the space above the memory array stack. The conductive film is only functioned as a word line select line for word lines and not functioned as a series selection line (SSL) for the memory cells. The memory device does not include series select switches sharing control electrodes with the word line switches. The conductive film of the memory device can be functioned as a word line plane, and the control electrodes of word line switches are electrically connected to the word line plane (or can be understood as having a common control electrode). Through such a configuration, a specific memory cell can be selected by applying voltages to the bit line, word line and word plane (word line switch), and the operation procedures of reading (READ), programming (or can be understood as SET operation procedure) or erasing (or can be understood as RESET operation procedure) can be performed to the selected memory cell. Moreover, the element configuration of the memory device allows the pillar structure to be formed after the transistor switch formed by the conductive film, the dielectric element and the channel element. As such, a high-temperature process for the transistor switch formed by the conductive film, the dielectric element and the channel element will not performed to the pillar structure, which prevents damage due to high temperature from the ovonic material layer of the pillar structure, and prevents degradation of the electrical performance of the memory device caused by element damage. In particular, the transistor switch including polycrystalline silicon usually require the use of high-temperature processes; the memory device of the present disclosure can avoid damage to the ovonic material layer of the pillar structure due to high-temperature process for polycrystalline silicon. In addition, the present disclosure also provides another memory device in which the pillar structure is formed before the transistor switch; the transistor switch of this memory device can use indium gallium zinc oxide (IGZO) instead of polycrystalline silicon, and the high-temperature process for polycrystalline silicon can be omitted; as such, damage to the ovonic material layer of the pillar structure due to high-temperature process can be avoided.

It is noted that the structures and methods as described above are provided for illustration. The disclosure is not limited to the configurations and procedures disclosed above. Other embodiments with different configurations of known elements can be applicable, and the exemplified structures could be adjusted and changed based on the actual needs of the practical applications. It is, of course, noted that the configurations of figures are depicted only for demonstration, not for limitation. Thus, it is known by people skilled in the art that the related elements and layers in a semiconductor structure, the shapes or positional relationship of the elements and the procedure details could be adjusted or changed according to the actual requirements and/or manufacturing steps of the practical applications.

While the disclosure has been described by way of example and in terms of the exemplary embodiment(s), it is to be understood that the disclosure is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A memory device, comprising:
    a stack structure comprising a memory array stack and a staircase stack;
    an insulating film on the memory array stack along a first direction;
    a conductive film on the staircase stack and on a sidewall of the insulating film;
    a pillar element on the staircase stack and passing through the conductive film; and
    memory cells in the memory array stack and electrically connected to the pillar element,
    wherein the conductive film and the insulating film are disposed along a second direction perpendicular to the first direction.

2. The memory device according to claim 1, wherein the pillar element comprises a dielectric element and a channel element, and the dielectric element is between the channel element and the conductive film.

3. The memory device according to claim 2, wherein the conductive film, the dielectric element and the channel element forms a transistor switch.

4. The memory device according to claim 2, wherein the conductive film, the dielectric element and the channel element forms a word line switch.

5. The memory device according to claim 2, wherein the channel element extends beyond an upper surface and a lower surface of the conductive film.

6. The memory device according to claim 1, wherein the pillar element comprises a first pillar portion, a second pillar portion and a third pillar portion electrically connected to each other, the second pillar portion is between the first pillar portion and a third pillar portion, the second pillar portion comprises a dielectric element, a channel element and a pad, the dielectric element surrounds the channel element, and the pad is between the channel element and the third pillar portion.

7. The memory device according to claim 1, wherein the first pillar portion has a first end and a second end opposite to the first end, the first end is on an upper surface of the staircase stack, and the second end connects to the second pillar portion.

8. The memory device according to claim 1, wherein the pillar element extends along the first direction and passes through the conductive film, the insulating film overlaps the memory array stack in the first direction, and the conductive film overlaps the staircase stack in the first direction.

9. The memory device according to claim 1, further comprising:
    a pillar structure comprising an ovonic material layer and passing through the memory array stack.

10. The memory device according to claim 9, wherein the pillar structure comprises an electrode layer on an inner surface or an outer surface of the ovonic material layer.

11. The memory device according to claim 9, wherein the pillar structure comprises a first electrode layer and a second electrode layer, the ovonic material layer is between the first electrode layer and the second electrode layer.

12. The memory device according to claim 9, wherein the pillar structure comprises a conductive pillar surrounded by the ovonic material layer, the conductive pillar is functioned as a bit line connected to the memory cells.

13. The memory device according to claim 9, wherein an upper surface of the pillar structure is higher than an upper surface of the conductive film.

14. The memory device according to claim 1, wherein when operating the memory device to turn on a selected memory cell of the memory cells, a bias direction of a voltage applied to a bit line electrically connected to the selected memory cell in RESET operation procedure is opposite to a bias direction of a voltage applied to the bit line electrically connected to the selected memory cell in SET operation procedure.

15. The memory device according to claim 1, further comprising:
    a wire on the conductive film and electrically connected to the pillar element, wherein the wire extends along a third direction; and
    another conductive film, wherein the conductive film and the another conductive film are arranged apart from each other along the third direction, wherein the first direction, the second direction and the third direction are perpendicular to each other.

16. A method for operating a memory device according to claim 1, the memory device comprises memory cells, a plurality of bit lines electrically connected to the memory cells, a plurality of word lines electrically connected to the memory cells, and a plurality of word line switches electrically connected to the memory cells and the plurality of word lines, wherein the method comprises:
    applying a word line voltage to a word line of the plurality of word lines electrically connected to a selected memory cell of the memory cells, applying a control voltage to a word line switch of the plurality of word line switches electrically connected to the selected memory cell, and applying a bit line voltage to a bit line of the plurality of bit lines electrically connected to the selected memory cell to turn on the selected memory cell, wherein the word line switch and the bit line are controlled independently.

17. The method according to claim 16, further comprising:

applying a ground voltage to word lines of the plurality of word lines electrically connected to unselected memory cells of the memory cells, apply a ground control voltage to word line switches of the plurality of word line switches electrically connected to the unselected memory cells, and applying a ground voltage to bit lines of the plurality of bit lines electrically connected to the unselected memory cells to turn off the unselected memory cells.

18. The method according to claim 16, wherein the memory device comprises ovonic material layers surrounding the plurality of bit lines.

19. The method according to claim 16, wherein the memory device comprises:

a stack structure comprising a memory array stack and a staircase stack;

an insulating film on the memory array stack;

a conductive film on the staircase stack and on a sidewall of the insulating film; and a pillar element on the staircase stack and passing through the conductive film, wherein the memory cells are in the memory array stack and electrically connected to the pillar element.

20. The method according to claim 16, wherein the bit line voltage comprises a first bit line voltage and a second bit line voltage, the first bit line voltage is applied to the bit line of the plurality of bit lines electrically connected to the selected memory cell to turn on the selected memory cell to perform a RESET operation procedure, the second bit line voltage is applied to the bit line of the plurality of bit lines electrically connected to the selected memory cell to turn on the selected memory cell to perform a SET operation procedure, a bias direction of the first bit line voltage is opposite to a bias direction of the second bit line voltage.

* * * * *